US010952449B2

(12) United States Patent
Sizer et al.

(10) Patent No.: US 10,952,449 B2
(45) Date of Patent: Mar. 23, 2021

(54) GAS INFUSED MILK PRODUCT AND METHOD OF MAKING THE SAME

(71) Applicant: David F. Paolella, Wayland, MA (US)

(72) Inventors: Charles Sizer, Lincoln, MA (US); Charlie Sizer, Lincoln, MA (US); Ron Jerome, Lincoln, MA (US)

(73) Assignee: David F. Paolella, Wayland, MA (US)

( * ) Notice: Subject to any disclaimer, the term of this patent is extended or adjusted under 35 U.S.C. 154(b) by 265 days.

(21) Appl. No.: 15/507,862

(22) PCT Filed: Sep. 9, 2015

(86) PCT No.: PCT/US2015/049218
§ 371 (c)(1),
(2) Date: Mar. 1, 2017

(87) PCT Pub. No.: WO2016/040503
PCT Pub. Date: Mar. 17, 2016

(65) Prior Publication Data
US 2017/0290350 A1    Oct. 12, 2017

Related U.S. Application Data

(60) Provisional application No. 62/048,154, filed on Sep. 9, 2014.

(51) Int. Cl.
*A23C 1/16* (2006.01)
*A23C 1/14* (2006.01)
(Continued)

(52) U.S. Cl.
CPC .................. *A23C 1/14* (2013.01); *A23C 1/16* (2013.01); *A23C 9/1206* (2013.01); *A23C 9/1307* (2013.01); *A23C 9/1315* (2013.01)

(58) Field of Classification Search
CPC ........ A23C 1/16; A23C 9/1206; A23C 9/1422
(Continued)

(56) References Cited

U.S. PATENT DOCUMENTS

| 934,641 A | 9/1909 | Wagner |
| 2,319,362 A | 5/1943 | Wouters |

(Continued)

FOREIGN PATENT DOCUMENTS

| CA | 2298166 A1 * | 9/2000 | ........... A23C 9/1524 |
| EP | 1707056 | 10/2006 | |

(Continued)

OTHER PUBLICATIONS

Using Brix Refractormeters to Evaluate Calf Nutrition, Dairy News, May 10, 2012 (2 pages).

(Continued)

*Primary Examiner* — Reginald Alexander
(74) *Attorney, Agent, or Firm* — Gesmer Updegrove LLP

(57) ABSTRACT

The invention provides a gas infused milk product, wherein the gas infused milk product comprises a lactose hydrolyzed concentrated milk infused with a soluble gas. The invention also provides methods of making such a product. Such methods include providing milk (skim milk, 1% milk, 2% milk, whole milk, half and half, cream or other milk product) and concentrating and hydrolyzing the milk with lactase to from a lactose hydrolyzed milk concentrate. The milk can be concentrated in vacuo (in a vacuum) in order to remove the dissolved gasses from the lactose hydrolyzed milk concentrate. Soluble gasses, such as nitrous oxide or carbon dioxide are then introduced into the lactose hydrolyzed milk concentrate to form a gas infused milk concentrate. In one aspect of this invention, the gas infused milk concentrate is then introduced into a stream of carbonated or still water resulting in a gas infused milk beverage.

22 Claims, 9 Drawing Sheets

(51) Int. Cl.
*A23C 9/12* (2006.01)
*A23C 9/13* (2006.01)

(58) Field of Classification Search
USPC .................. 426/34, 42, 477, 522, 583, 654
See application file for complete search history.

(56) References Cited

U.S. PATENT DOCUMENTS

| | | | |
|---|---|---|---|
| 2,439,612 | A | 4/1948 | Peebles et al. |
| 2,668,765 | A | 2/1954 | Stimpson |
| 2,738,279 | A | 3/1956 | Stimpson et al. |
| 4,497,834 | A | 2/1985 | Barta |
| 4,919,960 | A | 4/1990 | Ahmed et al. |
| 5,064,660 | A | 11/1991 | Silver |
| 5,635,232 | A * | 6/1997 | Wallace ............... A23L 2/54 141/18 |
| 6,039,985 | A | 3/2000 | Kamarei |
| 6,635,302 | B1 | 10/2003 | Huang et al. |
| 6,887,505 | B2 | 5/2005 | Reaves et al. |
| 9,207,222 | B2 * | 12/2015 | Tata .................. G01N 33/0006 |
| 2001/0007690 | A1 | 7/2001 | Girsh |
| 2003/0113408 | A1 | 6/2003 | Clark et al. |
| 2005/0214409 | A1 | 9/2005 | Tossavainen et al. |
| 2006/0057247 | A1 | 3/2006 | Nguyen et al. |
| 2007/0166447 | A1 | 7/2007 | Ur-Rehman et al. |
| 2007/0172548 | A1 | 7/2007 | Cale et al. |
| 2008/0050492 | A1 | 2/2008 | Buetler et al. |
| 2008/0069924 | A1 | 3/2008 | Zeller et al. |
| 2009/0317514 | A1 | 12/2009 | Sizer |
| 2011/0159165 | A1 * | 6/2011 | Nair .................... A23C 9/137 426/582 |
| 2012/0164277 | A1 | 6/2012 | Robinson et al. |
| 2012/0258199 | A1 | 10/2012 | Tams et al. |
| 2013/0011515 | A1 | 1/2013 | Knights |
| 2013/0101722 | A1 * | 4/2013 | Sepcic ................. A23L 2/54 426/548 |
| 2013/0142904 | A1 | 6/2013 | Holst et al. |
| 2013/0287892 | A1 | 10/2013 | Knights |
| 2017/0000146 | A1 | 1/2017 | Sizer |
| 2017/0290350 | A1 | 10/2017 | Sizer et al. |

FOREIGN PATENT DOCUMENTS

| | | |
|---|---|---|
| KR | 20000049535 | 8/2000 |
| KR | 100367113 B1 | 1/2003 |
| KR | 20030010351 | 2/2003 |
| KR | 20040103818 | 12/2004 |
| WO | 03094623 | 11/2003 |

OTHER PUBLICATIONS

International Search Report and Written Opinion for Application No. PCT/US2015/049218 dated Dec. 7, 2015 (11 pages).

International Preliminary Report on Patentability for Application No. PCT/US2015/049218 dated Mar. 14, 2017 (10 pages).

European Patent Office Search Report for Application No. 15840446.7 dated Feb. 9, 2018 (10 pages).

Cunningham et al., System Identification of a Falling-Film Evaporator in the Dairy Industry, USARTH, p. 1-7, 2006.

Bylund, Chapter 16 of Dairy Processing Handbook, 1995, Tetra Pak Processing Systems AB, S-221 86 Lund, Sweden.

Henning, D.R. et al., Major advances in concentrated and dry milk products, cheese, and milk fat-based spreads, J. Dairy Sci., 89(4):1179-1188 (2006).

H. Eddleman, Composition of Human, Cow and Goats Milk, Indiana Biolab, 1999 accessed at http://www.goatworld.com/articles/goatmilk/colostrum.shtml.

European Patent Office Search Report for Application No. 15840446.7 dated Feb. 19, 2018, 10 pages.

International Search Report and Written Opinion issued by the International Searching Authority, the Korean Intellectual Property Office, dated Feb. 17, 2010 in related international application No. PCT/US2009/043329, 8 pages.

International Preliminary Report on Patentability issued by the International Bureau of WIPO dated Jan. 5, 2011 in related international application No. PCT/US2009/048329, 6 pages.

Supplementary European Search Report issued by the European Patent Office dated Jun. 10, 2011 in related European Application No. 09798504.8, 5 pages.

Communication pursuant to Rules 161(2) and 162 EPC issued by the European Patent Office dated Feb. 1, 2011 in related European Application No. 09798504, 2 pages.

Get the Facts: Types of Milk, accessed at https://milklife.com/articles/nutrition/types-of-dairy-milk, 2019, 7 pages.

Anon, Water Activity of Foods Table, Penn State Extension, 2017, 3 pages.

Fontana, Water Activity's Role in Food Safety and Quality, foodsafetysite.com, 2001, accessed at https://www.foodsafetymagazine.com/magazine-archive1/februarymarch-2001/water-activitye28099s-role-in-food-safety-and-quality/, 4 pages.

Milk, How Products are Made, vol. 4, 2006, accessed at http://www.madehow.com/Volume-4/Milk.html, 10 pages.

Communication pursuant to Article 94(3) EPC issued by the European Patent Office in related European Patent Application No. 15840446.7 dated Jun. 23, 2020, 5 pages.

* cited by examiner

|  |  | Water Activity (Aw) | |
|---|---|---|---|
|  |  | 0.85 | 0.92 |
| Milk | fructose% (w/w) | Percent solids (w/w) | |
| Skim | 0 | 69.8 | 53.2 |
|  | 2 | 6.9 | 52.2 |
|  | 4 | 68.2 | 51.38 |
| 1% | 0 | 71.6 | 55.5 |
|  | 2 | 70.5 | 54 |
|  | 4 | 69.6 | 53 |
| 2% | 0 | 73.5 | 57 |
|  | 2 | 72.1 | 56 |
|  | 4 | 71 | 54.7 |
| Whole (3.3% milk fat) | 0 | 75.6 | 60.3 |
|  | 2 | 74 | 58.3 |
|  | 4 | 72.7 | 56.7 |
| Half and half (11.3% milk fat) | 0 | 83.5 | 71.3 |
|  | 2 | 81.4 | 68.3 |
|  | 4 | 79.5 | 65.9 |
| Cream (45% milk fat) | 0 | 93.3 | 87.22 |
|  | 2 | 91.84 | 84.7 |
|  | 4 | 90.5 | 82.43 |

FIG. 9

GAS INFUSED MILK PRODUCT AND METHOD OF MAKING THE SAME

CROSS REFERENCE TO RELATED APPLICATION

This application is a U.S. national stage entry of International Patent Application No. PCT/US2015/049218, filed on Sep. 9, 2015, which claims the benefit of U.S. Provisional Patent Application No. 62/048,154, filed on Sep. 9, 2014, the entire contents of each of which are herein fully incorporated by reference.

TECHNICAL FIELD

The present invention relates to a milk concentrate, methods of making the milk concentrate, a milk product, including a gas infused or carbonated milk product, and methods of making the milk product.

BACKGROUND

Milk is a nutritious beverage that is consumed worldwide. As such, milk is shipped, sometimes at great distances, from production facilities to consumers. Milk is perishable and thus, must be refrigerated when transported. Additionally, 88% of milk is water, which adds volume and weight and thus, cost, to the shipping of milk.

Non-fat dry milk and whole powered milk contain 1% water and thus, may be transported in a cost effective manner. However, the evaporation and spray dry processes utilized in making such milks alter the nature of the proteins, resulting in oxidized off-flavors and cooked milk flavors. Additionally, concentrates such non-fat dry milk and whole powdered milk may not be gas infused or carbonated upon reconstitution.

Accordingly, a need exists in the art for milk concentrates that provide a fresh taste when re-constituted and may be gas infused or carbonated as well as methods for making such milk concentrates.

SUMMARY

In one aspect, the present invention provides a method for gas infusing milk. The method comprises providing milk (skim milk, 1% milk, 2% milk, whole milk, half and half, cream or other milk product) and concentrating and hydrolyzing the milk with lactase to from a lactose hydrolyzed milk concentrate. In one embodiment the milk is concentrated in vacuo (in a vacuum) in order to remove the dissolved gasses from the lactose hydrolyzed milk concentrate. Soluble gasses, such as nitrous oxide or carbon dioxide are then introduced into the lactose hydrolyzed milk concentrate to form a gas infused milk concentrate. In one aspect of this invention, the gas infused milk concentrate is then introduced into a stream of carbonated or still water resulting in a gas infused milk beverage. This gas infused milk beverage has excellent dispersal of dissolved solids, suitably between 7-16 RI Brix.

In another aspect, the invention provides a method for gas infusing milk, the method comprising providing a lactose hydrolyzed milk concentrate having a solids concentration of about 50%-77% (w/w). Soluble gasses are introduced into the lactose hydrolyzed milk concentrate to form a gas infused milk concentrate.

In yet another aspect, the invention provides another method for gas infusing milk. The method comprises providing milk (skim milk, 1% milk, 2% milk, whole milk, half and half, cream or other milk product) and concentrating the milk by evaporating the milk in a multi-stage evaporator until the milk has between 34-50% solids (w/w) forming a first concentrated milk. This first concentrated milk is then hydrolyzed by adding lactase to form a lactose hydrolyzed milk concentrate. This lactose hydrolyzed milk concentrate is then further concentrated by evaporating the milk in a vacuum evaporator at a pressure of 2.5 psia or less to form a final lactose hydrolyzed milk concentrate. Soluble gasses such as carbon dioxide or nitrous oxide are introduced into the final lactose hydrolyzed milk concentrate to form a gas infused milk concentrate.

In another aspect, the invention provides another method for gas infusing milk. The method comprises providing milk (skim milk, 1% milk, 2% milk, whole milk, half and half, cream or other milk product) and concentrating the milk by using reverse osmosis by passing the milk through one or more membrane filters until the milk has between 20-40% solids (w/w) forming a first concentrated milk. This first concentrated milk is then hydrolyzed by adding lactase to form a lactose hydrolyzed milk concentrate. This lactose hydrolyzed milk concentrate is then further concentrated by evaporating the milk in a vacuum evaporator at a pressure of 2.5 psia or less to form a final lactose hydrolyzed milk concentrate. Soluble gasses such as carbon dioxide or nitrous oxide are introduced into the final lactose hydrolyzed milk concentrate to form a gas infused milk concentrate.

In another aspect, the invention provides a gas infused milk product, wherein the gas infused milk product comprises a lactose hydrolyzed concentrated milk infused with a soluble gas.

BRIEF DESCRIPTION OF THE DRAWINGS

FIG. 9 shows a table of the percent solids (w/w) and water activity of lactose hydrolyzed milk concentrates made from different milk starting products and having different amounts of fructose added to the milk concentrate.

DETAILED DESCRIPTION

Figure 1:
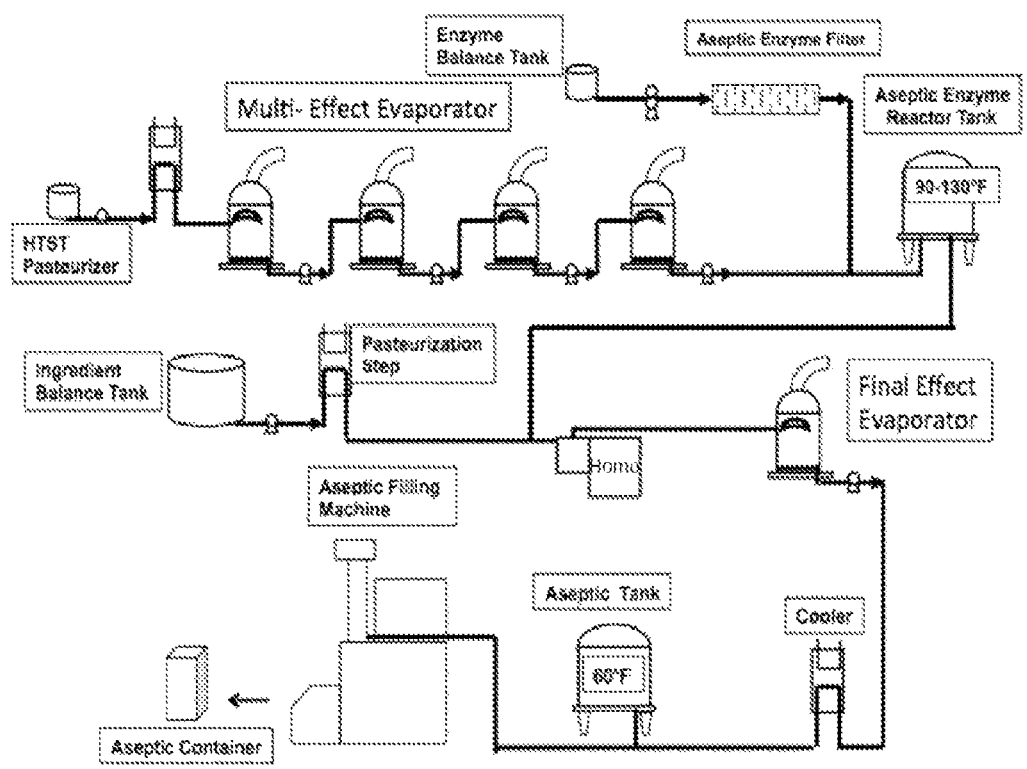
FIG. 1 shows a schematic illustrating the method steps described in Example 1.

The present invention relates to a method of making milk concentrate and of gas infusing such a milk concentrate to make a gas infused milk product. This milk concentrate may be stored at ambient temperatures for extended periods of time without spoilage of and microbial growth within the milk concentrate. As such, the milk concentrate is shelf-stable. Given this and its decreased water content, the milk concentrate is readily transported in a cost effective manner.

Upon reconstitution, the milk concentrate may be gas infused or carbonated, has a fresh taste, and is lactose free. The inclusion of nitrous oxide in the milk concentrate promotes mixing of the milk concentrate with water (i.e., increases the solubility of the milk concentrate in water) while the inclusion of a sugar such as fructose in the milk concentrate increases the solubility and dispersibility of the milk concentrate in water. Additionally, the milk concentrate has a low viscosity and is thixotropic. As such, the milk concentrate may be readily utilized in a dispenser that employs laminar flow mixing of two streams, i.e., a stream of milk concentrate and a stream of water (e.g., still water or water super-saturated with carbon dioxide), to form a milk product with a fresh taste and that is lactose free.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety, including U.S. Published patent application Ser. No. 12/488,591 filed Jun. 22, 2009 and published as U.S. Patent Application Publication No. 2009/0317514, incorporated by reference in its entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

"High temperature, short time pasteurization," "HTST pasteurization," or "flash pasteurization" refers herein to heating a perishable fluid, for example, milk at 161° F. (72.2° C.) for 15 seconds or by any process which meets or exceeds Grade "A" Pasteurized Milk Ordinance 2009 Revision (1)(FF). HTST pasteurization may inactivate any vegetative pathogenic bacteria and/or spoilage microorganisms present in the milk.

"Lactose-free" refers herein to a greater than 70%, and preferably a greater than 95%, reduction in an initial amount of lactose in a fluid (e.g., milk) by enzymatic hydrolysis of the lactose by lactase enzyme.

"Solids" refers herein to all parts of a mixture which are not liquid or gas under normal conditions; solids may be dissolved or suspended in liquid medium, for example, water. Solids include, but are not limited to, milk solids not fat, milk fat, fat from other sources, emulsifiers, sugars, flavors, Vitamins (e.g., vitamins A, D and C), other approved food ingredients, or any combination thereof.

"Standardized milk" refers herein to milk, in which the original fat content, and thus, ratio of fat to other milk solids, has been changed. The original fat content may be changed by the removal of milk fat, by the addition of skim milk, or by the addition of cream, or by any combination thereof. Milk product such as (but not limited to) skim milk (0.0.5% butterfat), 1% butterfat milk, 2% butterfat milk, whole milk (3.25-3.5% butterfat), half and half (10.5-18% butterfat), medium cream (25% butterfat), whipping cream (30% butterfat), or cream (45% butter fat).

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. Method of Making a Milk Product

The present invention relates to a method of making a shelf-stable lactose-free milk concentrate that can be readily re-constituted as a still or gas infused milk product. The milk product may have a fresh taste (e.g., not a cooked taste) and be lactose-free. As described below in more detail, in some embodiments, the milk product may be a carbonated milk product.

The method includes concentrating milk to form a lactose hydrolyzed milk concentrate and packaging the lactose hydrolyzed milk concentrate. The lactose hydrolyzed milk concentrate may not support microbial growth. The lactose hydrolyzed milk concentrate may receive a thermal treatment sufficient to inactivate vegetative pathogens The method may also include re-constituting the lactose hydrolyzed milk concentrate to form a milk product. In some embodiments, re-constituting the lactose hydrolyzed milk concentrate may include adding water to the milk concentrate to form the milk product. In other embodiments, re-constituting the lactose hydrolyzed milk concentrate may include introducing nitrous oxide, carbon dioxide, other soluble gasses, or a combination thereof into the lactose hydrolyzed milk concentrate to form a gas infused milk product. In still other embodiments, re-constituting the lactose hydrolyzed milk concentrate may include adding water to and introducing nitrous oxide, carbon dioxide, other soluble gasses or a combination thereof into the milk concentrate to form the gas infused milk product.

a. Concentrating the Milk to Form a Milk Concentrate

The method concentrates the milk to form the milk concentrate. The milk concentrate is described below in more detail. The initial pre-concentrating of the milk may include evaporation, reverse osmosis, or a combination of evaporation and reverse osmosis to remove water. Concentrating the milk may be done aseptically.

(1) Milk

The milk concentrated by the method may be skim (i.e., fat free) milk, skim milk with about 9.0% (w/w) to about 9.4% (w/w) solids, cream, half and half, whole milk, reduced fat milk (i.e., 2% milk), low fat milk (i.e., 1% milk) homogenized milk, non-homogenized milk, or any combination thereof. The milk may be non-homogenized milk.

The milk may be pasteurized. The milk may be high temperature, short time (HTST) pasteurized. In some embodiments, HTST pasteurization may be used when a water activity of less than 0.85 is employed to control microbial growth in a concentrated milk. A water activity of from 0.85 to 0.92 may require a sterilization process adequate to attain commercial sterility in the concentrated milk as defined by the United States Federal Drug Administration (FDA) in 21 C.F.R. § 113. In some embodiments, the thermal treatment may be specified by a process authority and treated in excess of the limit defined by the process authority.

(2) Milk Concentrate

Concentrating the milk removes water and dissolved gases from the milk to form the milk concentrate. This removal of water and dissolved gases may be done aseptically.

The milk concentrate, before a final in vacuo evaporation and the addition of any supplemental solids (additional fats, additional sugars, flavorings, emulsifiers, vitamins, etc.) may have a solids (milk solids (no fat) and milk fat solids) concentration of about 10% to about 50%, about 10% to about 45%, about 10% to about 40%, about 10% to about 35%, about 10% to about 30%, about 10% to about 25%, about 10% to about 20%, about 10% to about 15%, about 15% to about 50%, about 20% to about 50%, about 25% to about 50%, about 30% to about 50%, about 35% to about 50%, about 40% to about 50%, about 45% to about 50%, about 10% to about 13%, about 13% to about 18%, about 18% to about 27%, about 28% to about 34%, about 34% to about 42%, about 42% to about 50%, about 28% to about 32%, about 34% to about 50%, about 15% to about 45%, about 20% to about 40%, or about 25% to about 35%, or about 20%-40%, or about 34%-50%, 30%-45%, 14%-50%, or about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, or about 50%.

(3) Evaporation

Concentrating the milk to form the milk concentrate may include evaporation. This evaporation may remove water and/or dissolved gases from the milk and increase the solids concentration of the milk such that the resulting milk concentrate contains less water than the milk, less dissolved gases than the milk, and/or a higher solids concentration than the milk. In certain aspects of the invention, vacuum evaporation can be done to remove dissolved gasses from the evaporated milk concentrates. In one embodiment, the evaporated milk concentrate can have 0-40 mg/L of dissolved gasses. In another embodiment, the evaporated milk concentrate can have 0-4 mg/L of dissolved oxygen. In some embodiments, the milk concentrate may contain less than about 3 psia, 5 psia or 14 psia of dissolved gasses. The lower the amount of dissolved gasses in the evaporated milk concentrate, the more soluble gasses may be added to the milk concentrate in later processes.

Evaporation may include introducing or injecting the milk into a multi-effect evaporator, which in turn, removes water and/or dissolved gases from the milk to form the milk concentrate. The multi-effect evaporator may not have more than 7 effects. The multi-effect evaporator may include one or more effects, two or more effects, three or more effects, four or more effects, or at least one effect, at least two effects, at least three effects, at least four effects, at least five effects, at least six effects or at least seven effects.

The milk may be injected into a first effect of the evaporator and heated at a temperature of about 60° C. to about 100° C., or about 65° C., about 70° C., about 75° C., about 80° C., about 85° C., about 90° C., about 95° C., about 100° C., about 68° C., about 69° C., or about 70° C. in the multi-effect evaporator. The injected milk may be pasteurized prior to injected the milk into the first effect of the evaporator by heating the milk for about 0.01 second to about 15 seconds.

In some embodiments, the evaporator may include multiple effects, in which the milk may be injected into the first effect of the evaporator to remove water from the milk, thereby concentrating the milk to about 10% to 13% solids. This concentrated milk is then heated in subsequent effects to further increase the solids content from about 13% to about 18%. This process is repeated until the solids content is about 40-50% solids or other suitable ranges.

In some embodiments, the resulting milk concentrate from the first effect of the evaporator (i.e., a first effect milk concentrate) may be injected into the second effect of the evaporator and heated at a temperature of about 65° C. to evaporate water, remove dissolved gases, and increase the solids content from about 13% to about 18%. The resulting milk concentrate from the second effect of the evaporator (i.e., a second effect milk concentrate) may be injected into the third effect of the evaporator and heated at a temperature of about 62° C. to evaporate water, remove dissolved gases, and increase the solids content from about 18% to about 27%. The resulting milk concentrate from the third effect of the evaporator (i.e., a third effect milk concentrate) may be injected into the fourth effect of the evaporator and heated at a temperature of about 60° C. to evaporate water, remove dissolved gases, and increase the solids content from about 34% to about 42%. The resulting milk concentrate from the fourth effect of the evaporator (i.e., a fourth effect milk concentrate) may be incubated with lactase enzyme, as described below in more detail, to hydrolyze lactose in the fourth effect milk concentrate.

(4) Reverse Osmosis

Concentrating the milk to form the milk concentrate may include reverse osmosis. This reverse osmosis may remove water and/or dissolved gases from the milk and increase the solids concentration of the milk such that the resulting milk concentrate contains less water than the milk, less dissolved gases than the milk, and/or a higher solids concentration than the milk.

Reverse osmosis may include passing the milk over a water permeable membrane. Reverse osmosis may also include passing the milk through the membrane in the presence of an applied pressure. The applied pressure may be about 1 bar to about 100 bar, about 5 bar to about 100 bar, about 10 bar to about 100 bar, about 15 bar to about 100 bar, about 20 bar to about 100 bar, about 25 bar to about 100 bar, about 30 bar to about 100 bar, about 35 bar to about 100 bar, about 40 bar to about 100 bar, about 45 bar to 100 bar, about 50 bar to about 100 bar, about 55 bar to about 100 bar, about 60 bar to about 100 bar, about 65 bar to about 100 bar, about 70 bar to about 100 bar, about 75 bar to about 100 bar, about 80 bar to about 100 bar, about 1 bar to about 95 bar, about 1 bar to about 90 bar, about 1 bar to about 85 bar, about 1 bar to about 80 bar, about 1 bar to about 75 bar, about 1 bar to about 70 bar, about 1 bar to about 65 bar, about 1 bar to about 60 bar, about 1 bar to about 55 bar, about 1 bar to about 50 bar, about 1 bar to about 45 bar, about 1 bar to about 40 bar, about 1 bar to about 35 bar, about 1 bar to about 30 bar, about 1 bar to about 25 bar, about 1 bar to about 20 bar, about 5 bar to about 95 bar, about 10 bar to about 90 bar, about 15 bar to about 85 bar, about 20 bar to about 80 bar, or about 25 bar to about 75 bar, or about 1 bar, about 2 bar, about 3 bar, about 4 bar, about 5 bar, about 6 bar, about 7 bar, about 8 bar, about 9 bar, about 10 bar, about 11 bar, about 12 bar, about 13 bar, about 14 bar, about 15 bar, about 16 bar, about 17 bar, about 18 bar, about 19 bar, about 20 bar, about 21 bar, about 22 bar, about 23 bar, about 24 bar, about 25 bar, about 26 bar, about 27 bar, about 28 bar, about 29 bar, about 30 bar, about 31 bar, about 32 bar, about 33 bar, about 34 bar, about 35 bar, about 36 bar, about 37 bar, about 38 bar, about 39 bar, about 40 bar, about 41 bar, about 42 bar, about 43 bar, about 44 bar, about 45 bar, about 46 bar, about 47 bar, about 48 bar, about 49 bar, about 50 bar, about 51 bar, about 52 bar, about 53 bar, about 54 bar, about 55 bar, about 56 bar, about 57 bar, about 58 bar, about 59 bar, about 60 bar, about 61 bar, about 62 bar, about 63 bar, about 64 bar, about 65 bar, about 66 bar, about 67 bar, about 68 bar, about 69 bar, about 70 bar, about 71 bar, about 72 bar, about 73 bar, about 74 bar, about 75 bar, about 76 bar, about 77 bar, about 78 bar, about 79 bar, about 80 bar, about 81 bar, about 82 bar, about 83 bar, about 84, about 85 bar, about 86 bar, about 87 bar, about 88 bar, about 89 bar, about 90 bar, about 91 bar, about 92 bar, about 93 bar, about 94 bar, about 95 bar, about 96 bar, about 97 bar, about 98 bar, about 99 bar, or about 100 bar of pressure.

Reverse osmosis may include passing the milk over the membrane such that water is removed from the milk, thereby concentrating the other components in the milk (e.g., casein, lactose, whey, fat, and so forth) to form the milk concentrate. Such a milk concentrate may have a solids concentration up to about 20, 22, 24, 26, 28, 30, 32, 33, 34, 35, 36, 37, 38, 39, or 40% (w/w). The milk concentrate may have a solids concentration of about 20% (w/w) to about 40% (w/w) or about 32% (w/w) to about 40% (w/w) or about 32% (w/w) to about 35% (w/w).

Reverse osmosis may include passing the milk through one or more, two or more, three or more, or at least one, at least two, or at least three membranes. Reverse osmosis may include passing the milk through one or more, two or more, three or more, or at least one, at least two, or at least three membranes in the presence of the applied pressure. The applied pressure is described above. Reverse osmosis may include passing the milk through one or more, two or more, three or more, or at least one, at least two, or at least three membranes such that water is removed from the milk, thereby concentrating the other components in the milk to form the milk concentrate. Such a milk concentrate may have a solids concentration up to about 20, 22, 24, 26, 28, 30, 32, 33, 34, 35, 36, 37, 38, 39, or 40% (w/w). The milk concentrate may have a solids concentration of about 20% (w/w) to about 40% (w/w) or about 32% (w/w) to about 40% (w/w) or about 32% (w/w) to about 35% (w/w).

b. Removal of Lactose in the Milk Concentrate

The method includes hydrolyzing the lactose in the milk concentrate. Alternatively, in some embodiments, the lactose may be hydrolyzed prior to concentration of the milk. Such removal may include hydrolysis of the lactose in the milk concentrate. The hydrolysis may be enzymatic hydrolysis of lactose in the milk concentrate. Removing or reducing the lactose in the milk concentrate may include adding lactase to the milk concentrate. Lactase, which is described below in more detail, cleaves lactose to generate glucose and galactose. Accordingly, the hydrolyzed milk concentrate contains a lower concentration of lactose than the milk concentrate and a higher concentration of glucose and galactose than the milk concentrate. This higher concentration of glucose and galactose lends the hydrolyzed milk concentrate an increased sweetness as compared to a sweetness of the milk concentrate. This higher concentration of glucose and galactose provides the hydrolyzed milk concentrate with a lower water activity than a water activity of the milk concentrate or the above-described milk. This lowering of the water activity may prevent or reduce the growth of microorganisms in the milk concentrate.

In some embodiments, the lactase may be a commercial lactase enzyme (e.g., the lactase enzyme sold under the name MAXILACT by DSM, The Netherlands). In other embodiments, about 2400 NLU/lb lactase to about 6000 NLU/lb lactase may be added to the milk concentrate. In other embodiments, about 4000 NLU/lb lactase or about 6000 NLU/lb lactase may be added to the milk concentrate. In still other embodiments, the lactase may be added to the milk concentrate at a concentration of about 0.1% (w/w) to about 0.001% (w/w). In other embodiments lactase may be added to the milk concentrate at a concentration of about 0.01% (w/w) or about 0.006% (w/w).

The lactase may be aseptically added to the milk concentrate to avoid contaminating the milk concentrate. Such aseptic addition of the lactase enzyme to the milk concentrate may include sterile filtering of the lactase. The sterile filtering of the lactase may include passing the lactase through at 0.2 µm filter.

The lactase and milk concentrate may be incubated together for about 1 hour to about 24 hours, 1 hour to about 20 hours, 1 hour to about 15 hours, 1 hour to about 10 hours, or about 1 hour to about 4 hours, or about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours to form the hydrolyzed milk concentrate. This incubation may occur in a pre-sterilized tank.

The lactase and milk concentrate may be incubated together for about 1 hour to about 4 hours, or about 1 hour, about 2 hours, about 3 hours, or about 4 hours at a temperature of about 7° C. to about 60° C., about 7° C. to about 55° C., about 7° C. to about 50° C., about 7° C. to about 45° C., about 7° C. to about 40° C., about 7° C. to about 35° C., about 7° C. to about 30° C., about 7° C. to about 25° C., about 7° C. to about 20° C., about 7° C. to about 15° C., about 10° C. to about 60° C., about 15° C. to about 60° C., about 20° C. to about 60° C., about 25° C. to about 60° C., about 30° C. to about 60° C., about 35° C. to about 60° C., about 40° C. to about 60° C., about 50° C. to about 60° C., about 10° C. to about 55° C., about 15° C. to about 50° C., about 20° C. to about 45° C., about 25° C. to about 40° C., about 7° C., about 8° C., about 9° C., about 10° C., about 11° C., about 12° C., about 13° C., about 14° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., or about 60° C. to form the hydrolyzed milk concentrate. The milk concentrate or hydrolyzed milk concentrate may be incubated at the above-described temperatures for longer than 4 hours if the water activity is lower than 0.94. A water activity lower than 0.94 may inhibit microbial growth. In other embodiments, the lactase and milk concentrate may be incubated together for about 24 hours at less than 8° C.

In still some embodiments, the milk concentrate may be cooled after concentration to less than 8° C. The cooled milk concentrate may be incubated at less than 8° C. for up to 24 hours. About 0.006% (w/w) (i.e., about 4000 NLU/lb) may be added to the cooled milk concentrate before cooling or after cooling. The resulting mixture may be incubated for about 24 hours at less than 8° C. As described below in more detail, sugar (e.g., fructose) and other ingredients may be added to the resulting hydrolyzed milk concentrate.

In other embodiments, the milk concentrate may be optionally cooled after concentration to less than 8° C. and then incubated for 48 hours at this temperature. The milk concentrate may then be brought to a temperature of about 35° C. to about 45° C. and 0.01% (w/w) lactase (i.e., about 6000 NLU/lb) may be added to the milk concentrate. The resulting mixture may be incubated for 3 hours to 4 hours at about 35° C. to about 45° C. to form the hydrolyzed milk concentrate. The hydrolyzed milk concentrate may then be cooled to less than 8° C. and cream and sugar (e.g., fructose) may be added. The resulting mixture may be incubated for up to 20 hours at less than 8° C. before further evaporation as described below to form the final hydrolyzed milk concentrate.

In still other embodiments, cream and sugar (e.g., fructose) may be added to the milk concentrate. The milk concentrate may then be heated at 162° C. for about 63 seconds and then cooled to about 35° C. to about 45° C. The milk concentrate may be placed in a pre-sterilized, aseptic tank and 0.01% (w/w) lactase (i.e., about 6000 NLU/lb) may be aseptically added to the milk concentrate. Aseptic addition of the lactase may include filtering the lactase. The resulting mixture may be incubated at 35° C. to about 45° C. for about 4 hours to about 8 hours to form the hydrolyzed milk concentrate. The hydrolyzed milk concentrate may be incubated for up to 40 hours before further evaporation as described below in more detail.

(1) Hydrolyzed Milk Concentrate

The method includes adding lactase to the milk concentrate to hydrolyze the lactose in the milk concentrate into glucose and galactose, thereby generating the hydrolyzed milk concentrate. Accordingly, the hydrolyzed milk concentrate has a lower concentration of lactose than the milk concentrate and a higher concentrate of glucose and galactose than the milk concentrate. This higher concentration of glucose and galactose makes the hydrolyzed milk concentrate sweeter than the milk concentrate. Additionally, this higher concentration of glucose and galactose increases the water activity of the hydrolyzed milk concentrate as compared to the water activity of the milk concentrate. This increased water activity of the hydrolyzed milk concentrate helps prevent or inhibit the growth of microorganisms that may be pathogenic and/or cause spoilage.

The hydrolyzed milk concentrate may have less than about 11% (w/w), 10% (w/w), 9% (w/w), 8% (w/w), 7% (w/w), 6% (w/w), 5% (w/w), 4% (w/w), 3% (w/w), 2% (w/w), or 1% (w/w) lactose. In some embodiments, the hydrolyzed milk concentrate may not contain lactose (i.e., 0% (w/w) lactose). In other embodiments, the hydrolyzed milk concentrate may have less than 2% (w/w) lactose.

About 89%, 90%, 91%, 92%, 93%, 94%, 95%, 96%, 97%, 98%, 99%, or 100% of the initial amount of lactose in the milk concentrate may be hydrolyzed by the lactase, thereby generating a hydrolyzed milk concentrate having about 11% (w/w), 10% (w/w), 9% (w/w), 8% (w/w), 7% (w/w), 6% (w/w), 5% (w/w), 4% (w/w), 3% (w/w), 2% (w/w), 1%, or 0% (w/w) lactose.

c. Addition of Sugar to the Hydrolyzed Milk Concentrate

The method includes adding sugar to the hydrolyzed milk concentrate. The addition of sugar further reduces the water activity of the hydrolyzed milk concentrate. This further reduction in the water activity of the hydrolyzed milk concentrate may prevent or inhibit the growth of pathogenic and/or spoilage causing microorganisms, for example, but not limited to, *C. botulinum* and *B. cereus*, as discussed in more detail below.

The sugar may be an anhydrous sugar. The sugar may be fructose, anhydrous fructose, liquid fructose syrup, or a polyol (e.g., xylitol), or a combination thereof. The sugar may be fructose syrup, anhydrous fructose, or the combination thereof. The sugar may not be glucose, sucrose, or galactose, or any combination thereof.

The sugar may not be glucose, sucrose, or galactose, or the combination thereof because these sugars increase the viscosity of the hydrolyzed milk concentrate upon their addition to the hydrolyzed milk concentrate. This increased viscosity may be caused by these sugars forming crystals, which in turn, may hinder the flow, and thus, re-constitution of the final hydrolyzed milk concentrate discussed below. Increased crystal formation in turn decreases flow and thus, hinders reconstitution. Fructose (or anhydrous fructose or fructose syrup) or a polyol (e.g., xylitol), unlike glucose, sucrose, and galactose, decreases the viscosity (i.e., decreased crystal formation) of the hydrolyzed milk concentrate and thus, increases dispersibility of the hydrolyzed milk concentrate when gas is added as compared to a hydrolyzed milk concentrate without added sugar.

The sugar may be added to the hydrolyzed milk concentrate in an amount of about 1% (w/w) to about 10% (w/w), about 1% (w/w) to about 9% (w/w), about 1% (w/w) to about 8% (w/w), about 1% (w/w) to about 7% (w/w), about 1% (w/w) to about 6% (w/w), about 1% (w/w) to about 5% (w/w), about 1% (w/w) to about 4% (w/w), about 1% (w/w) to about 3% (w/w), about 1% (w/w) to about 2% (w/w), about 2% (w/w) to about 10% (w/w), about 3% (w/w) to about 10% (w/w), about 4% (w/w) to about 10% (w/w), about 5% (w/w) to about 10% (w/w), about 6% (w/w) to about 10% (w/w), about 7% (w/w) to about 10% (w/w), about 8% (w/w) to about 10% (w/w), about 9% (w/w) to about 10% (w/w), about 2% (w/w) to about 9% (w/w), about 3% (w/w) to about 8% (w/w), about 4% (w/w) to about 7% (w/w), or about 5% (w/w) to about 6% (w/w), or about 1% (w/w), about 2% (w/w), about 3% (w/w), about 4% (w/w), about 5% (w/w), about 6% (w/w), about 7% (w/w), about 8% (w/w), about 9% (w/w), or about 10% (w/w).

d. Addition of Other Ingredients to the Hydrolyzed Milk Concentrate

The method may include adding ingredients other than sugar to the hydrolyzed milk concentrate. These other ingredients may include, but are not limited to, one or more vitamins and one or more flavorings. The one or more vitamins may include, but is not limited to, Vitamin A, Vitamin D or Vitamin C, or any combination thereof. The one or more flavorings may include, but is not limited to, a chocolate flavoring, a strawberry flavoring, or any combination thereof.

Normally, chocolate milk made with cocoa powder cannot be carbonated due to its high viscosity and nucleation sites. The present invention solves this problem by employing a chocolate flavoring with reduced or no nucleation sites. Such a chocolate flavoring may be an emulsion of cocoa butter or an emulsion of cocoa butter with suspended cocoa powder.

In some embodiments, sodium stearoyl lactylate may be utilized as the emulsifier to modify the surface of the cocoa. This modification may smooth the surface of the cocoa butter emulsion; a smooth surface decreases nucleation sites for foaming and promotes uniform carbonation by retaining the gas, e.g., carbon dioxide. Nucleation sites and carbonation are described below in more detail.

e. Evaporation of the Hydrolyzed Milk Concentrate to Form a Final Hydrolyzed Milk Concentrate The method includes evaporation of the hydrolyzed milk concentrate to form a final hydrolyzed milk concentrate. Evaporation of the hydrolyzed milk concentrate may include introducing the hydrolyzed milk concentrate into a final effect evaporator. The final effect evaporator may remove water from the hydrolyzed milk concentrate to form the final hydrolyzed milk concentrate. As such, the final hydrolyzed milk concentrate may have a higher solids concentration than the hydrolyzed milk concentrate (and milk concentrate and milk described above).

The final effect evaporator may be operated under vacuum, thereby removing dissolved gases (e.g., $N_2$, $O_2$, and $CO_2$) from the hydrolyzed milk concentrate to form the final hydrolyzed milk concentrate. The vacuum evaporation can be done to remove dissolved gasses from the evaporated milk concentrates. In one embodiment, the evaporated lactose hydrolyzed milk concentrate can have 0-40 mg/L of dissolved gasses. In another embodiment, the evaporated lactose hydrolyzed milk concentrate can have 0-4 mg/L of dissolved oxygen. The lower the amount of dissolved gasses in the evaporated milk concentrate, the more soluble gasses may be added to the milk concentrate in later processes.

In the final effect evaporator, the hydrolyzed milk concentrate may be heated for about 10 seconds to about 10 minutes, about 10 seconds to about 9.5 minutes, about 10 seconds to about 9 minutes, about 10 seconds to about 8.5 minutes, about 10 second to about 8 minutes, about 10 seconds to about 7.5 minutes, about 10 seconds to about 7 minutes, about 10 seconds to about 6.5 minutes, about 10 seconds to about 6 minutes, about 10 seconds to about 5.5 minutes, about 10 seconds to about 5 minutes, about 10 seconds to about 4.5 minutes, about 10 seconds to about 4 minutes, about 10 seconds to about 3.5 minutes, about 10 seconds to about 3 minutes, about 10 seconds to about 2.5 minutes, about 10 seconds to about 2 minutes, about 10 seconds to about 1.5 minutes, about 10 seconds to about 1 minute, about 10 seconds to about 50 seconds, about 10 seconds to about 40 seconds, about 10 seconds to about 30 seconds, about 15 seconds to about 10 minutes, about 20 seconds to about 10 minutes, about 25 seconds to about 10 minutes, 30 seconds to about 10 minutes, about 35 seconds to about 10 minutes, about 40 seconds to about 10 minutes, about 45 seconds to about 10 minutes, about 50 seconds to about a 10 minutes, about 55 seconds to about 10 minutes, about 1 minute to about 10 minutes, about 1.5 minutes to about 10 minutes, about 2 minutes to about 10 minutes, about 2.5 minutes to about 10 minutes, about 3 minutes to about 10 minutes, about 3.5 minutes to about 10 minutes, about 4 minutes to about 10 minutes, about 4.5 minutes to about 10 minutes, about 5 minutes to about 10 minutes, about 5.5 minutes to about 10 minutes, about 6 minutes to about 10 minutes, about 6.5 minutes to about 10 minutes, about 7 minutes to about 10 minutes, about 7.5 minutes to about 10 minutes, about 8 minutes to about 10 minutes, about 8.5 minutes to about 10 minutes, or about 9 minutes to about 10 minutes, or about 10 seconds, about 11 seconds, about 12 seconds, about 13 seconds, about 14 seconds, about 15 seconds, about 16 seconds, about 17 seconds, about 18 seconds, about 19 seconds, about 20 seconds, about 21 seconds, about 22 seconds, about 23 seconds, about 24 seconds, about 25 seconds, about 26 seconds, about 27 seconds, about 28 seconds, about 29 seconds, about 30 seconds, about 31 seconds, about 32 seconds, about 33 seconds, about 34 seconds, about 35 seconds, about 36 seconds, about 37 seconds, about 38 seconds, about 39 seconds, about 40 seconds, about 41 seconds, about 42 seconds, about 43 seconds, about 44 seconds, about 45 seconds, about 46 seconds, about 47 seconds, about 48 seconds, about 49 seconds, about 50 seconds, about 51 seconds, about 52 seconds, about 53 seconds, about 54 seconds, about 55 seconds, about 56 seconds, about 57 seconds, about 58 seconds, about 59 seconds, about 60 seconds, about 65 seconds, about 70 seconds, about 75 seconds, about 80 seconds, about 85 seconds, about 90 seconds, about 95 seconds, about 100 seconds, about 105 seconds, about 110 seconds, about 115 seconds, about 120 seconds, about 1 minute, about 1.5 minutes, about 2 minutes, about 2.5 minutes, about 3 minutes, about 3.5 minutes, about 4 minutes, about 4.5 minutes, about 5 minutes, about 5.5 minutes, about 6 minutes, about 6.5 minutes, about 7 minutes, about 7.5 minutes, about 8 minutes, about 8.5 minutes, about 9 minutes, about 9.5 minutes, or about 10 minutes at a temperature of about 32° C. to about 50° C., about 32° C. to about 47° C., about 32° C. to about 43° C., about 32° C. to about 40° C., about 32° C. to about 35° C., about 35° C. to about 50° C., about 37° C. to about 50° C., about 40° C. to about 50° C., about 43° C. to about 50° C., about 47° C. to about 50° C., or about 38° C. to about 42° C., or about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., or about 50° C. or at a pressure of less than about 5 psi, or at a pressure of less than about 2.5 psi to remove water and/or dissolved gases from the hydrolyzed milk concentrate and increase the solids concentration of the hydrolyzed milk concentrate, thereby forming the second hydrolyzed milk concentrate.

The final hydrolyzed milk concentrate can have a solids concentration (solids including (1) milk solids (not fat) (2) milk fat (3) any fat from other sources (4) any emulsifiers, (5) any added sugars, (6) any added flavorings, or (5) any added vitamins) of about 40% to about 94%, about 40% to about 90%, about 40% to about 85%, about 40% to about 80%, about 40% to about 75%, about 40% to about 70%, about 40% to about 65%, about 40% to about 60%, about 40% to about 55%, about 40% to about 50%, about 40% to about 45%, about 40% to about 90%, about 42% to about 70%, about 50% to about 77%, about 52% to about 94%, about 45% to about 94%, about 50% to about 94%, about 55% to about 94%, about 60% to about 94%, about 65% to about 94%, about 70% to about 94%, about 75% to about 94%, about 80% to about 94%, about 85% to about 94%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93% or about 94%.

The final hydrolyzed milk concentrate may have a lower water activity than the hydrolyzed milk concentrate because the final effect evaporator removed water from the hydrolyzed milk concentrate. This further reduction in the water activity of the final hydrolyzed milk concentrate may prevent or inhibit the growth of pathogenic and/or spoilage causing microorganisms, for example, but not limited to, *C. botulinum* and *B. cereus*.

The combination of lactose hydrolysis, addition of sugar to the hydrolyzed milk concentrate, and removal of water from hydrolyzed milk concentrate results in the final hydrolyzed milk concentrate having a water activity less than about 0.92, less than about 0.85, less than about 0.80, less than about 0.75, or about 0.85-0.92, or about 0.85 or lower. Growth of *C. botulinum* and *B. cereus* may be inhibited at a water activity of less than 0.93 and 0.915, respectively.

The final hydrolyzed milk concentrate may have less than about 5.0% (w/w), 4.9% (w/w), 4.8% (w/w), 4.7% (w/w), 4.6% (w/w), 4.5% (w/w), 4.4% (w/w), 4.3% (w/w), 4.2% (w/w), 4.1% (w/w), 4.0% (w/w), 3.9% (w/w), 3.8% (w/w), 3.7% (w/w), 3.6% (w/w), 3.5% (w/w), 3.4% (w/w), 3.3% (w/w), 3.2% (w/w), 3.1% (w/w), 3.0% (w/w), 2.9% (w/w), 2.8% (w/w), 2.7%, 2.6% (w/w), 2.5% (w/w), 2.4.% (w/w), 2.3% (w/w), 2.2% (w/w), 2.1% (w/w), 2.0% (w/w), 1.9% (w/w), 1.8% (w/w), 1.7% (w/w), 1.6% (w/w), 1.5% (w/w), 1.4% (w/w), 1.3% (w/w), 1.2% (w/w), 1.1% (w/w), 1.0% (w/w), 0.9% (w/w), 0.8% (w/w), 0.7% (w/w), 0.6% (w/w), 0.5% (w/w), 0.4% (w/w), 0.3% (w/w), 0.2% (w/w), or 0.1% (w/w) denatured protein. In some embodiments, the final hydrolyzed milk concentrate may not have denatured protein. This concentration (or lack) of denatured protein may allow the final hydrolyzed milk concentrate to be carbonated during re-constitution, which is described below in more detail. Additionally, this concentration (or lack) of denatured protein may allow the final hydrolyzed milk concentrate to not form films on one or more portions of a dispenser used in re-constituting the final hydrolyzed milk concentrate.

The final hydrolyzed milk concentrate may have less than about 5.0% (w/w), 4.9% (w/w), 4.8% (w/w), 4.7% (w/w), 4.6% (w/w), 4.5% (w/w), 4.4% (w/w), 4.3% (w/w), 4.2% (w/w), 4.1% (w/w), 4.0% (w/w), 3.9% (w/w), 3.8% (w/w), 3.7% (w/w), 3.6% (w/w), 3.5% (w/w), 3.4% (w/w), 3.3% (w/w), 3.2% (w/w), 3.1% (w/w), 3.0% (w/w), 2.9% (w/w), 2.8% (w/w), 2.7% (w/w), 2.6% (w/w), 2.5% (w/w), 2.4% (w/w), 2.3% (w/w), 2.2% (w/w), 2.1% (w/w), 2.0% (w/w), 1.9% (w/w), 1.8% (w/w), 1.7% (w/w), 1.6% (w/w), 1.5% (w/w), 1.4% (w/w), 1.3% (w/w), 1.2% (w/w), 1.1% (w/w), 1.0% (w/w), 0.9% (w/w), 0.8% (w/w), 0.7% (w/w), 0.6% (w/w), 0.5% (w/w), 0.4% (w/w), 0.3% (w/w), 0.2% (w/w), 0.1% (w/w), or 0% (w/w) lactose crystals. In some embodiments, the final hydrolyzed milk concentrate may not have lactose crystals. This concentration (or lack) of lactose crystals may reduce nucleation sites during re-constitution, and thus, may allow for a controlled foaming of the final hydrolyzed milk concentrate during re-constitution. This controlled foaming of the final hydrolyzed milk concentrate is a slower foaming caused by the reduced nucleation sites and thus, allows for mixing of the final hydrolyzed milk concentrate during re-constitution, which is described below in more detail. In turn, increased nucleation sites promotes more rapid, and thus, less controlled foaming of the final hydrolyzed milk concentrate during re-constitution.

Additionally the final hydrolyzed milk concentrate may have fat particle sizes of about 0.1 μm to about 10 μm.

f. Introduction of Soluble Gas into the Final Hydrolyzed Milk Concentrate

The method may include introducing or injecting a gas into the final hydrolyzed milk concentrate that is soluble in the second hydrolyzed milk concentrate (i.e., a soluble gas). The soluble gas may be introduced into the final hydrolyzed milk concentrate before or after packaging of the final hydrolyzed milk concentrate into the aseptic container. This injection of the soluble gas into the final hydrolyzed milk concentrate allows the final hydrolyzed milk concentrate to go into solution more quickly than a final hydrolyzed milk concentrate without injected soluble gas when the final hydrolyzed milk concentrate is re-constituted as described in more detail below.

The soluble gas may be, for example, but is not limited to, nitrous oxide, carbon dioxide, argon, helium, or any combination thereof. When the soluble gas is nitrous oxide or carbon dioxide, the partial pressure of nitrous oxide or carbon dioxide in the final hydrolyzed milk concentrate at about 10° C. to about 25° C. may be about 0 pounds per square inch at absolute pressure (psia) to about 15 psia, about 0 psia to about 88.2 psia, about 0 psai to about 14.7 psia, about 1 psia to about 15 psia, about 2 psia to about 15 psia, about 3 psia to about 15 psia, about 4 psia to about 15 psia, about 5 psia to about 15 psia, about 6 psia to about 15 psia, about 7 psia to about 15 psia, about 8 psia to about 15 psia, about 9 psia to about 15 psia, about 10 psia to about 15 psia, about 11 psia to about 15 psia, about 12 psia to about 15 psia, about 13 psia to about 15 psia, about 14 psia to about 15 psia, about 0 psia to about 14 psia, about 0 psia to about 13 psia, about 0 psia to about 12 psia, about 0 psia to about 11 psia, about 0 psia to about 10 psia, about 0 psia to about 9 psia, about 0 psia to about 8 psia, about 0 psia to about 7 psia, about 0 psia to about 6 psia, about 0 psia to about 5 psia, about 0 psia to about 4 psia, about 0 psia to about 3 psia, about 0 psia to about 2 psia, about 0 psia to about 1 psia, about 1 psia to about 14 psia, about 2 psia to about 13 psia, about 3 psia to about 12 psia, about 4 psia to about 11 psia, about 5 psia to about 10 psia, about 6 psia to about 9 psia, or about 7 psia to about 8 psia, or about 0 psia, about 1 psia, about 2 psia, about 3 psia, about 4 psia, about 5 psia, about 6 psia, about 7 psia, about 8 psia, about 9 psia, about 10 psia, about 11 psia, about 12 psia, about 13 psia, about 14 psia, or about 15 psia.

g. Packaging of the Final Hydrolyzed Milk Concentrate

The method may include packaging the final hydrolyzed milk concentrate into an aseptic container. Packaging may include an aseptic filling machine that transfers the final hydrolyzed milk concentrate to the aseptic container. This transfer may be done aseptically. The aseptic container may or may not be pressurized.

The final hydrolyzed milk concentrate may be held or stored in the aseptic container for at least about 30 minutes, 1 hours, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 25 hours, 26 hours, 27 hours, 28 hours, 29 hours, 30 hours, 31 hours, 32 hours, 33 hours, 34 hours, 35 hours, 36 hours, 37 hours, 38 hours, 39 hours, 40 hours, 41 hours, 42 hours, 43 hours, 44 hours, 45 hours, 46 hours, 47 hours, 48 hours, 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, 69 days, 1 month, 2 months, 3 months, 4 months, 5 months, 6 months, 7 months, 8 months, 9 months, 10 months, 11 months, 12 months, 13 months, 14 months, 15 months, 16 months, 17 months, 18 months, 19 months, 20 months, 21 months, 22 months, 23 months, 24 months, 1 year, or 2 years.

The final hydrolyzed milk concentrate may be held or stored in the aseptic container about 10° C. to about 18° C., about 10° C. to about 16° C., about 10° C. to about 14° C., about 10° C. to about 12° C., about 12° C. to about 18° C., about 14° C. to about 18° C., about 16° C. to about 18° C., or about 12° C. to about 16° C., or about 10° C., about 11° C., about 12° C., about 13° C., about 14° C., about 15° C., about 16° C., about 17° C., or about 18° C.

The final hydrolyzed milk concentrate may be held or stored in the aseptic container for at least about 30 minutes, 1 hours, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 25 hours, 26 hours, 27 hours, 28 hours, 29 hours, 30 hours, 31 hours, 32 hours, 33 hours, 34 hours, 35 hours, 36 hours, 37 hours, 38 hours, 39 hours, 40 hours, 41 hours, 42 hours, 43 hours, 44 hours, 45 hours, 46 hours, 47 hours, 48 hours, 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, 69 days, 1 month, 2 months, 3 months, 4 months, 5 months, 6 months, 7 months, 8 months, 9 months, 10 months, 11 months, 12 months, 13 months, 14 months, 15 months, 16 months, 17 months, 18 months, 19 months, 20 months, 21 months, 22 months, 23 months, 24 months, 1 year, or 2 years at about 10° C. to about 18° C., about 10° C. to about 16° C., about 10° C. to about 14° C., about 10° C. to about 12° C., about 12° C. to about 18° C., about 14° C. to about 18° C., about 16° C. to about 18° C., or about 12° C. to about 16° C., or about 10° C., about 11° C., about 12° C., about 13° C., about 14° C., about 15° C., about 16° C., about 17° C., or about 18° C.

h. Re-Constitution of the Final Hydrolyzed Milk Concentrate to Form a Milk Product The method includes re-constituting the final hydrolyzed milk concentrate to form the milk product. Re-constitution may include mixing the final gas-infused hydrolyzed milk concentrate with water to form the milk product. The water may be still water or water super-saturated with carbon dioxide. When water is super-saturated with carbon dioxide is utilized, the resulting milk product is carbonated.

The milk product (i.e. the re-reconstituted gas-infused hydrolyzed milk concentrate) may have a refractive index (RI) of about 6 Brix to about 16 Brix, about 7 Brix to about 16 Brix, about 8 Brix to about 16 Brix, about 9 Brix to about 16 Brix, about 10 Brix to about 16 Brix, about 11 Brix to about 16 Brix, about 12 Brix to about 16 Brix, about 13 Brix to about 16 Brix, about 14 Brix to about 16 Brix, about 15 Brix to about 16 Brix, about 6 Brix to about 15 Brix, about 6 Brix to about 14 Brix, about 6 Brix to about 13 Brix, about 6 Brix to about 12 Brix, about 6 Brix to about 11 Brix, about 6 Brix to about 10 Brix, about 6 Brix to about 9 Brix, about 6 Brix to about 8 Brix, about 6 Brix to about 7 Brix, about 7 Brix to about 15 Brix, about 8 Brix to about 14 Brix, about 9 Brix to about 13 Brix, about 10 Brix to about 12 Brix, or about 10 Brix to about 16 Brix, or about 6 Brix, about 7 Brix, about 8 Brix, about 9 Brix, about 10 Brix, about 11 Brix, about 12 Brix, about 13 Brix, about 14 Brix, about 15 Brix, or about 16 Brix.

In some embodiments the milk product (i.e. the re-reconstituted gas-infused hydrolyzed milk concentrate) has a percentage of between 80%-100% of dissolution of solids. What is meant by a % of dissolution of solids is that combining a known mass of concentrate with a known % solids with a pre-determined mass of water, the resulting % solids when the solutions is fully mixed is easily calculable.

$$\text{expected \% solids} = \frac{\text{concentrate \% solids} * \text{concentrate mass}}{\text{concentrate mass} + \text{water mass}}$$

If the new solution is not fully mixed, then measured % solids in the new solution will be lower than the expected % solids. The ratio of measured % solids to expected solids is % dissolution. Suppose 1 mass of 40% solids concentrate is mixed with 3 masses of water, then the expected % solids is 10%. Suppose further that the mixture is let sit for 90 seconds after the combination of the two components with no mixing. A sample is drawn from the middle of the mixture (not from the bottom or top) and only shows 5% solids by a forced oven or refractive index method, then the % dissolution is 0.50 or 50%. In such a case, the separation of the components should be evident and milk concentrate would be observed at the bottom of the container.

In some embodiments, mixing may include using a dispenser that utilizes laminar flow mixing of the final hydrolyzed milk concentrate and the water. Such laminar flow mixing combines a stream of the final hydrolyzed milk concentrate and a stream of the water to generate the milk product. The final hydrolyzed milk concentrate may be thixotropic and a low viscosity, which together enabling mixing of the final hydrolyzed milk concentrate and water to form the milk product.

When the final hydrolyzed milk concentrate includes nitrous oxide and is exposed to other gases such as those gases in the water, the other gases dissolve in the final hydrolyzed milk concentrate, thereby decreasing the solubility of nitrous oxide and causing the nitrous oxide to nucleate. This nucleation, in turn, causes the final hydrolyzed milk concentrate to foam and mix with the water. Accordingly, the above described addition of the soluble gas, e.g., nitrous oxide, to the final hydrolyzed milk concentrate promotes mixing of the final hydrolyzed milk concentrate with water during re-constitution. Additionally, the nucleation of gases within the stream of the final hydrolyzed milk concentrate reduces the density of the final hydrolyzed milk concentrate stream, thereby creating a vertical streaming effect that contributes to the mixing process.

The present invention has multiple aspects, illustrated by the following non-limiting examples.

3. Examples

Example 1

Process with Aseptic Tank, Second Stream of Ingredients, and Homogenizer

Standardized 2% milk is HTST pasteurized and introduced into a multi-effect evaporator, where the milk is concentrated to 34% to 50% solids (FIG. 1). The concentrated milk is then stored in a pre-sterilized, aseptic tank at an elevated temperature of 100° F. (38° C.). During this 3 hour storage, 0.01% (w/w) aseptically filtered lactase (MAXILACT by DSM, The Netherlands) is mixed into the concentrated milk and hydrolyzed for 3 hours.

After completion of hydrolysis, the concentrated milk is metered into an evaporator as 14.5% (w/w) fructose is metered into the evaporator. The fructose is pasteurized by heat or UV treatment prior to addition to the concentrated milk. This pasteurization process for fructose inactivates vegetative pathogens, yeast, and mold. The streams of concentrated milk and fructose are mixed with a static or dynamic mixer (homogenizer) to provide uniform distribution within the mixture. This mixture of concentrated milk and fructose is introduced into a final effect evaporator, operating at 37° C. to 43° C. (up to a maximum of 50° C.) for 2 to 5 minutes at less than 2.5 psi. The final milk concentrate has a water activity below 0.92. The final milk concentrate is cooled to about 59° F. to 75° F. (15-25° C.) and aseptically packaged in a sterile container.

Example 2

Process with Second Thermal Process

Figure 2:
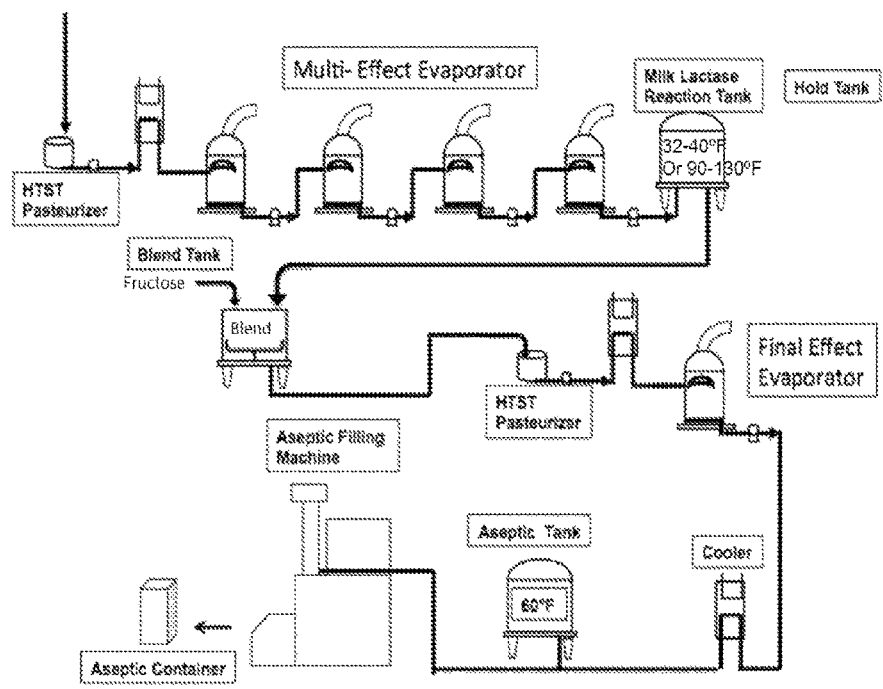
FIG. 2 shows a schematic illustrating the method steps described in Example 2.

Standarized whole milk is HTST pasteurized and introduced into a multi-effect evaporator, where the milk is concentrated to 34% to 50% solids (FIG. 2). The concentrated milk is transferred to a mixing tank at 100° F. or 38° C. for hydrolysis of lactose. Specifically, 0.01% (w/w) aseptically filtered lactase (MAXILACT by DSM, The Netherlands) was mixed into the concentrated milk. Hydrolysis occurs for 3 hours.

After completion of lactose hydrolysis, other ingredients, e.g., vitamins (e.g., 0.01% (w/w) Vitamin C) and 14.5% (w/w) fructose, were added to the hydrolyzed, concentrated milk to form a mixture. This mixture is thermally processed to inactivate pathogens and spoilage organisms. Specifically, the mixture is heated at 161.4° F. for 62 seconds.

The mixture is introduced into a final effect evaporator, operating at 37° C. to 43° C. (up to a maximum of 50° C.) for 2-5 minutes at less than 2.5 psi. The final milk concentrate has a water activity below 0.877. The final milk concentrate is cooled to about 15° C. and aseptically packaged in a sterile container.

Example 3

Process with Aseptic Tank and Second Stream of Ingredients

Figure 3:
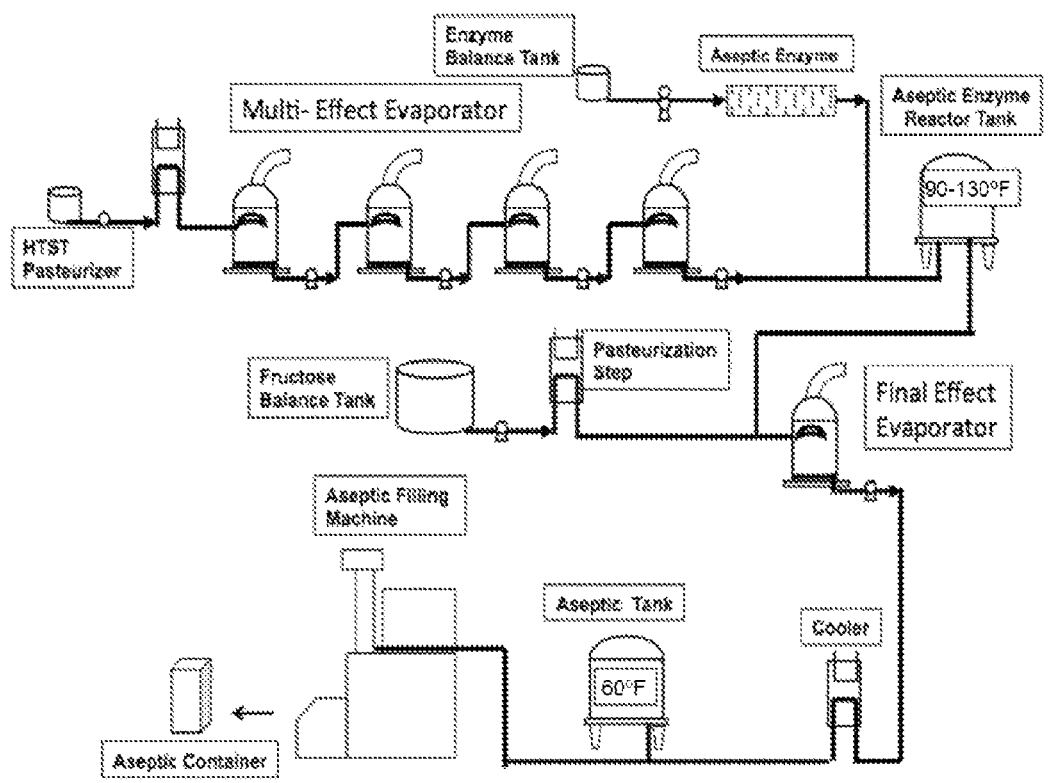
FIG. 3 shows a schematic illustrating the method steps described in Example 3.

Standarized milk is HTST pasteurized and introduced into a multi-effect evaporator, where the milk is concentrated to 34% to 50% solids (FIG. 3). The concentrated milk is then stored in a pre-sterilized, aseptic tank at an elevated temperature of 100° F. (38° C.) for hydrolysis of lactose. Specifically, 0.01% (w/w) aseptically filtered lactase (MAXILACT by DSM, The Netherlands) is mixed into the concentrated milk and the mixture is incubated for 3 hours.

After completion of hydrolysis, the concentrated milk is metered into an evaporator as 14.5% (w/w) fructose is metered into the evaporator. The fructose is pasteurized by UV or heat treatment to inactivate vegetative pathogens, yeast, and mold prior to addition of the fructose to the concentrated milk. The streams of concentrated milk and fructose are mixed with a static or dynamic mixer (homogenizer) to provide uniform distribution within the mixture. The homogenizer is in-line to control particle size and nucleation sites. This mixture of concentrated milk and fructose is introduced into a final effect evaporator, operating at 37° C. to 43° C. (up to a maximum of 50° C.) for 2-5 minutes at less than 2.5 psi. The final milk concentrate has a water activity below 0.877. The final milk concentrate is cooled to about 25° C. and aseptically packaged in a sterile container.

The process as described above in Example 3 is repeated with different standardized milk products and different amounts of fructose. The water activities and percentage solids to be observed as show in FIG. 9.

Example 4

Process with Membrane Concentration and Thermal Sterilization

Standarized milk is HTST pasteurized and introduced into a membrane system that removed the water fraction of the milk, leaving the remaining components of the milk in a concentrated state. The concentrated milk has 30% (w/w) solids.

The concentrated milk is transferred to a mixing tank and 0.006% (w/w) aseptically filtered lactase (MAXILACT by DSM, The Netherlands) is added to the concentrated milk. The resulting mixture is incubated at less than 8° C. for 24 hours.

After completion of lactose hydrolysis, other ingredients, e.g., vitamins (0.01% (w/w) Vitamin C) and 14.5% (w/w) fructose, were added to the hydrolyzed, concentrated milk to form a mixture. This mixture was heated at 161.4° F. for 60 seconds to inactivate pathogens and spoilage organsims.

The mixture is introduced into a final effect evaporator, operating at 37° C. to 43° C. (up to a maximum of 50° C.) for 20-40 seconds at less than 2.5 psi. The final milk concentrate has a water activity below 0.92. The final milk concentrate is cooled to about 15° C. and aseptically packaged in a sterile container.

Example 5

Process with Membrane Concentration

A lactose-hydrolyzed, single strength milk is HTST pasteurized and introduced into a membrane system that removed the water fraction of the milk, leaving the remaining components of the milk in a concentrated state. The concentrated milk has 30% (w/w) solids.

Other ingredients, e.g., vitamins (0.01% (w/w) Vitamin C) and 14.5% (w/w) fructose, are added to the hydrolyzed, concentrated milk to form a mixture. This mixture is heated at 161.4° F. for 63 seconds to inactivate pathogens and spoilage organisms. The mixture is introduced into a final effect evaporator, operating at 37° C. to 43° C. (up to a maximum of 50° C.) for 2-5 minutes at less than 2.5 psi. The final milk concentrate has a water activity below 0.90. The final milk concentrate is cooled to about 15° C. and aseptically packaged in a sterile container.

Example 6

In this example, a milk concentrate was prepared with 44% solids. The concentrate was divided into two fractions.

Figure 4:
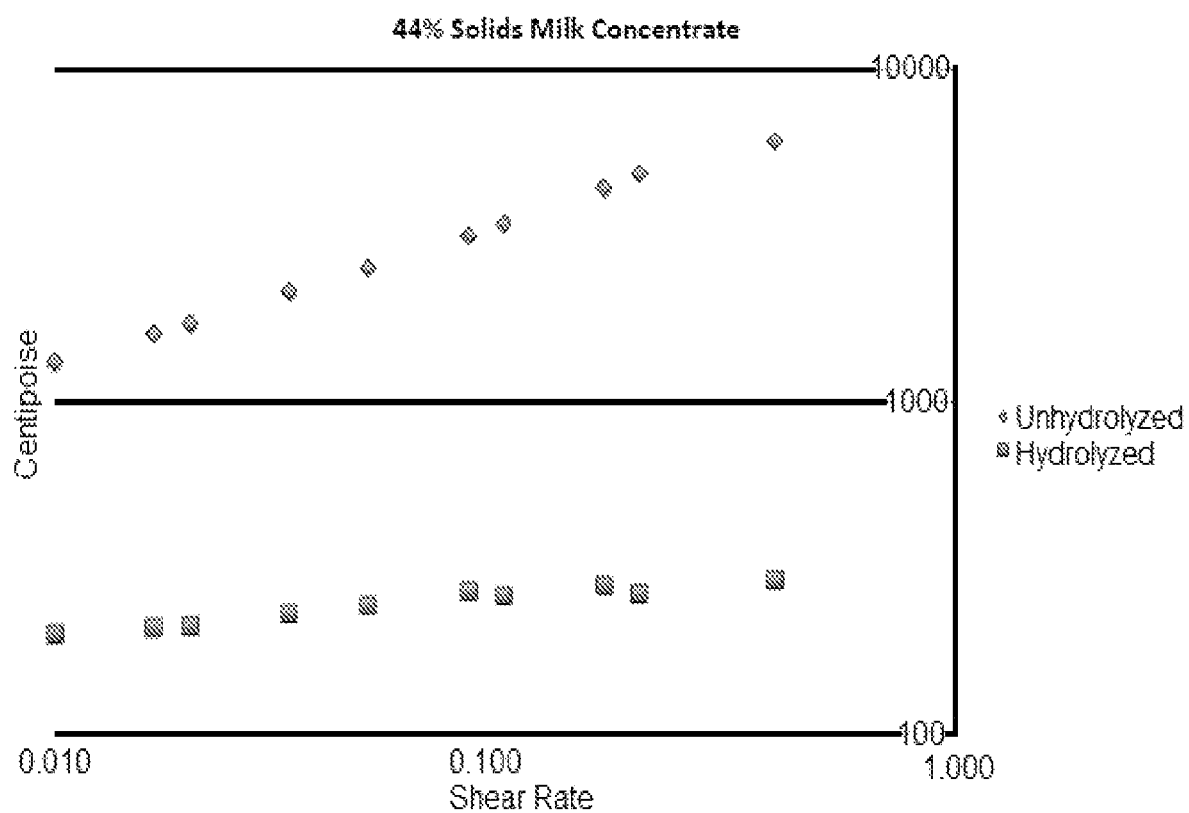
FIG. 4 shows a graph plotting shear rate against centipoise for un-hydrolyzed, 44% solids milk concentrate (diamonds) and hydrolyzed, 44% solids milk concentrate (squares).

To one fraction, lactase enzyme was added to hydrolyze the lactose to greater than 95%. The other fraction was the control. As can be seen from FIG. 4, there was a significant reduction in the viscosity of the hydrolyzed milk concentrate.

The two concentrates were then reconstituted by injecting 10 ml of concentrate into 50 ml of carbonated soda. After 90 seconds, the solublized fraction was determined using a brix refractometer. The hydrolyzed concentrate readily mixed with the carbonated soda aided by nucleation within the concentrate stream. After 90 seconds, the brix of the mixture was measured at 8.4, indicating that all of the mixture had been incorporated. The control concentrate was injected into the soda and very rapidly formed a tight layer of nucleation on the exterior of the stream. The cohesiveness of the concentrate prevented penetration of the soda into the interior, thus decreasing its mixability. Brix readings after 90 seconds averaged 1.25, indicating very poor mixing of the concentrate.

Example 7

Lactose Hydrolysis in the Presence and Absence of Fructose

Figure 5:
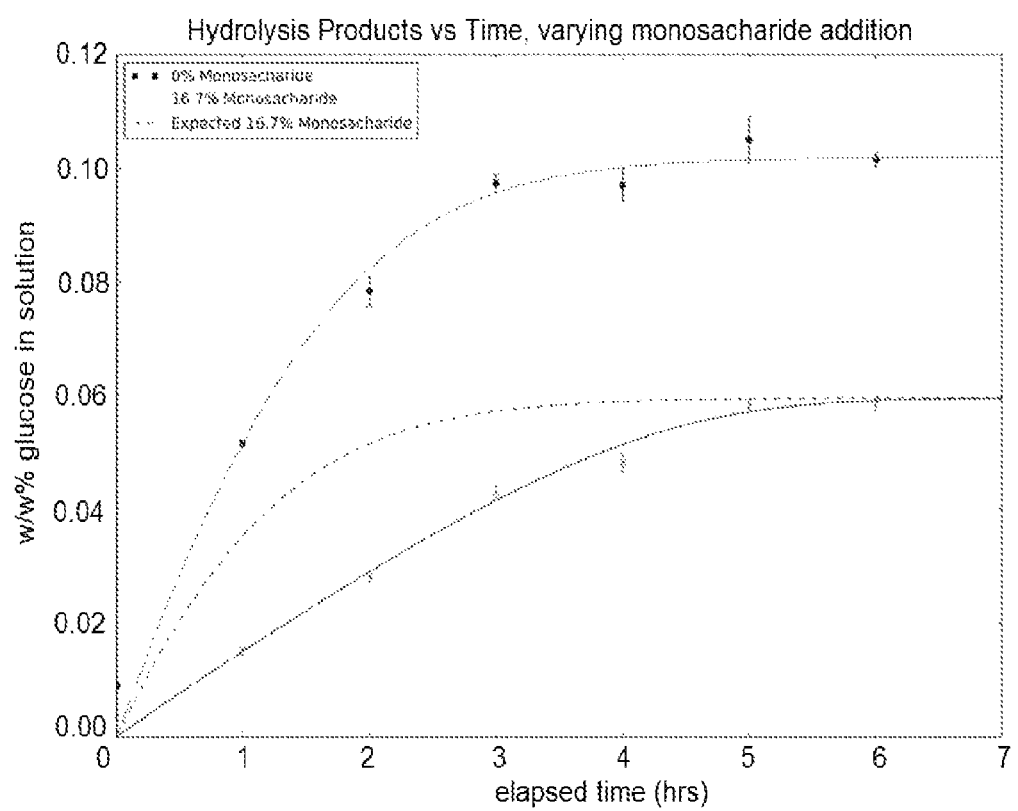
FIG. 5 shows a graph plotting elapsed time after lactase addition against w/w % of glucose in solution. Solid circle is lactose hydrolysis in the presence of 0% monosaccharide. X is lactose hydrolysis in the presence 16.7% monosaccharide. The dashed line represents the expected lactose hydrolysis in the presence of 16/7% monosaccharide.

A study was performed to examine the hydrolysis of lactose in the presence (16.7%) and absence (0%) of the monosaccharide fructose. Specifically, 0.01% (w/w) lactase (MAXILACT by DSM, The Netherlands) was added to milk and production of glucose was measured over time. The $V_{max}$ for each reaction was also determined and is shown below in Table. As shown in FIG. 5, the addition of the monosaccharide fructose before the addition of lactase to the milk slowed the hydrolysis of lactose, i.e., lactose hydrolysis was faster in the absence of fructose (circle) as compared to in the presence of fructose (x). This retardation of lactose hydrolysis was greater than expected; see the dashed line in FIG. 5, which shows the expected hydrolysis in the presence of the monosaccharide fructose while "x" indicated the observed hydrolysis in the presence of the monosaccharide fructose.

TABLE 1

| Solution | $V_{Max}$ |
| --- | --- |
| 0% Monosaccharide | 0.225 |
| 16.7% Monosaccharide | 0.035 |

Table 1 shows the maximum rate of reaction in two different solutions; the addition of monosaccharide retarded the progression of hydrolysis.

Example 8

Process with Nitrous Oxide Addition

Five hundred milliliters of a 1% milk fat, hydrolyzed concentrate (61.4 RI brix, 64.5% solids (w/w) was reconstituted to 1% fat with 4% added fructose and placed into an ISI whipped cream nitrous oxide foamer. An $N_2O$ charger was used to pressurize the container and the container was inverted several times. After 24 hours, the vessel was vented and the concentrate was held at atmospheric pressure for 12 hours at 4° C. or 40° F. A stream of ten milliliters of the concentrate was then added to 50 ml of soda or water to determine if the nitrous oxide affected the mixability and solubility of the concentrate.

The concentrate (without nitrous oxide) was first mixed with water to determine how rapidly it solubilized. Ten ml of the concentrate without nitrous oxide was placed in a syringe and injected in five seconds into 50 ml of water. The concentrate without nitrous oxide went into the water and was very stagnant, mixing very slowly with the water. After 90 seconds, the brix was 1.2-1.4. The concentrate at ambient pressure infused with nitrous oxide was introduced into water in the same manner. It was observed that the concentrate infused with nitrous oxide was vigorously mixing in the water with nucleation occurring within the filaments of concentrate. The bubble formation decreased the density of the concentrate, causing it to rise and fall in the water as a function of bubble formation and release. After 90 seconds, a refractive index of 7.0 was measured. This indicated a five-fold increase in the ability to mix in water.

The above-described experiment was then repeated injecting the concentrates into soda. The concentrate without nitrous oxide mixed with the soda and a refractive index brix reading of 6.2 was measured after 90 seconds. The experiment was repeated with the nitrous oxide infused concentrate. A very vigorous mixing was observed and the refractive index brix reading at 90 seconds was 11.9, indicating that it was over 90% soluble in that time frame.

Example 9

Figure 6:
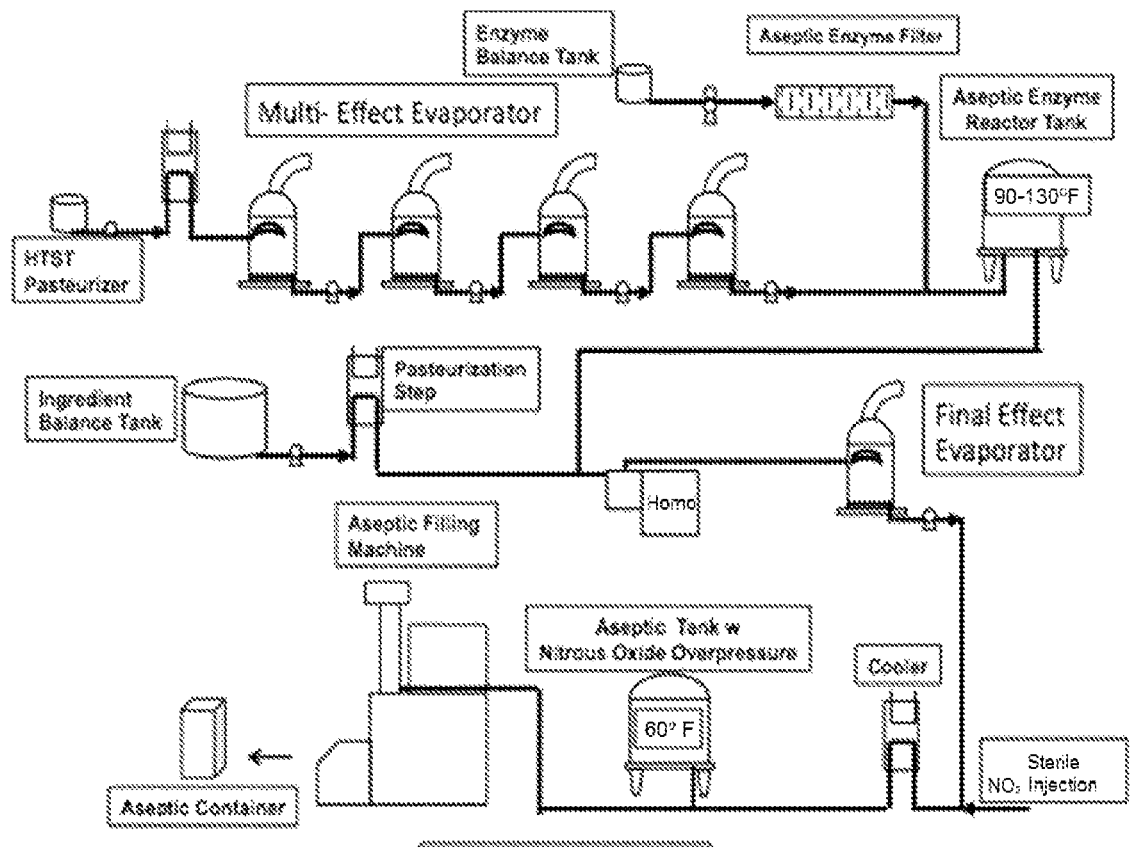
FIG. 6 shows a schematic illustrating the method steps described in Example 9.

Standarized milk is HTST pasteurized and introduced into a multi-effect evaporator, where the milk is concentrated to 34% to 50% solids (FIG. 6). The concentrated milk is then stored in a pre-sterilized, aseptic tank at an elevated temperature of 100° F. (38° C.) for hydrolysis of lactose. Specifically, 0.01% (w/w) aseptically filtered lactase (MAXILACT by DSM, The Netherlands) is mixed into the concentrated milk and the mixture is incubated for 3 hours.

After completion of hydrolysis, the concentrated milk is metered into an evaporator as 14.5% (w/w) fructose is metered into the evaporator. The fructose is pasteurized by UV or heat treatment to inactivate vegetative pathogens, yeast, and mold prior to addition of the fructose to the concentrated milk. The streams of concentrated milk and fructose are mixed with a static or dynamic mixer (homogenizer) to provide uniform distribution within the mixture. The homogenizer is in-line to control particle size and nucleation sites. This mixture of concentrated milk and fructose is introduced into a final effect evaporator, operating at 37° C. to 43° C. (up to a maximum of 50° C.) for 2-5 minutes at less than 2.5 psi. The final milk concentrate has a water activity below 0.877.

Sterile nitrous oxide is added in line at 6 bar to the final milk concentrate. The final milk concentrate with nitrous oxide is held in an aseptic tank such that the nitrous oxide is reduced to 16 psia in the tank. The final milk concentrate is cooled to about 25° C. and aseptically packaged in non-rigid (i.e., non-pressurized) sterile container at 14.4 psia.

Example 10

Figure 7:
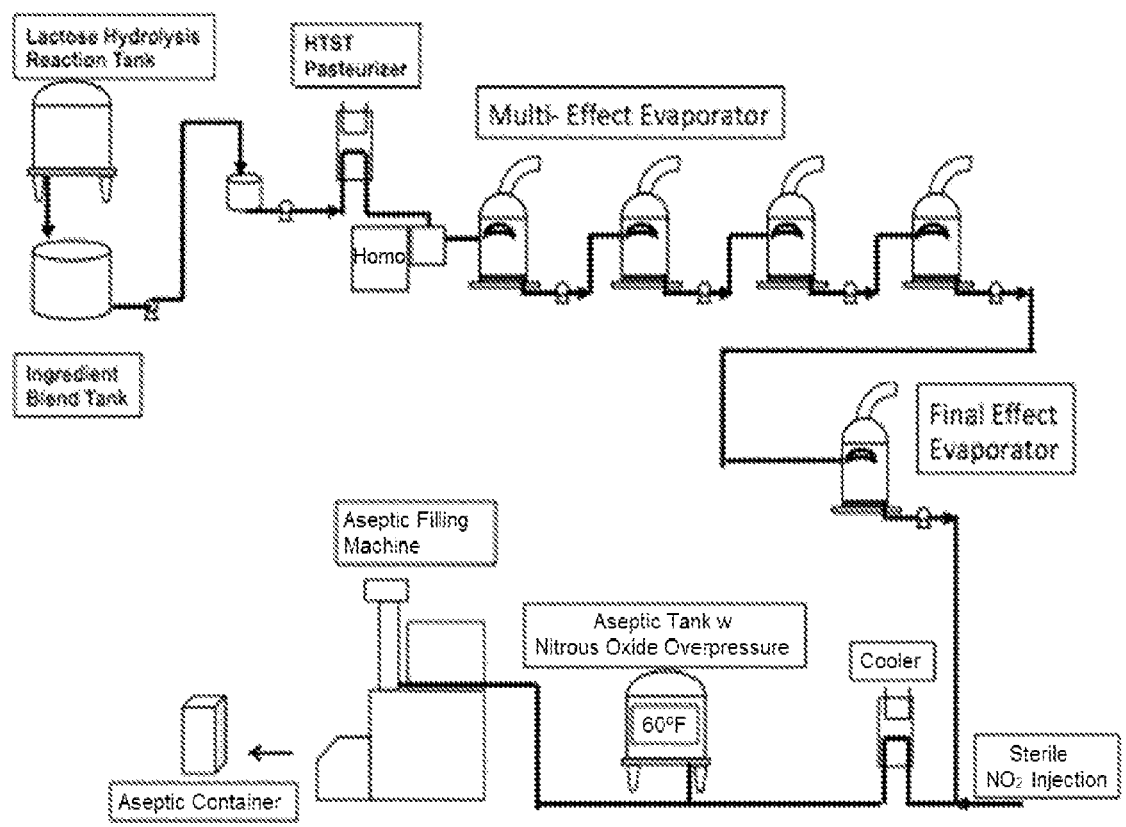
FIG. 7 shows a schematic illustrating the method steps described in Example 10.

Lactose in milk is hydrolyzed by the addition of 0.01% (w/w) aseptically sterile lactase (MAXILACT by DSM, The Netherlands) (FIG. 7). Sweeteners (e.g., 14.5% (w/w) fructose) are added to the hydrolyzed milk and the resulting mixture is heat treated at 161.4° F. for 63 seconds to inactivate pathogens and spoilage organisms. The mixture is homogenized with a dynamic mixer to provide uniform distribution within the mixture. The mixture is concentrated with a multiple effect evaporator. The final effect evaporator is operated at 100-110° F. (38-43° C.) for 2 to 5 minutes under 2.5 psi. The final milk concentrate has a water activity below 0.877.

Sterile nitrous oxide is added in line at 6 bar to the final milk concentrate. The final milk concentrate with nitrous oxide is held in an aseptic tank such that the nitrous oxide is reduced to 16 psia in the tank. The final milk concentrate is cooled to about 25° C. and aseptically packaged in non-rigid (i.e., non-pressurized) sterile container at 14.4 psia.

Example 11

Figure 8:
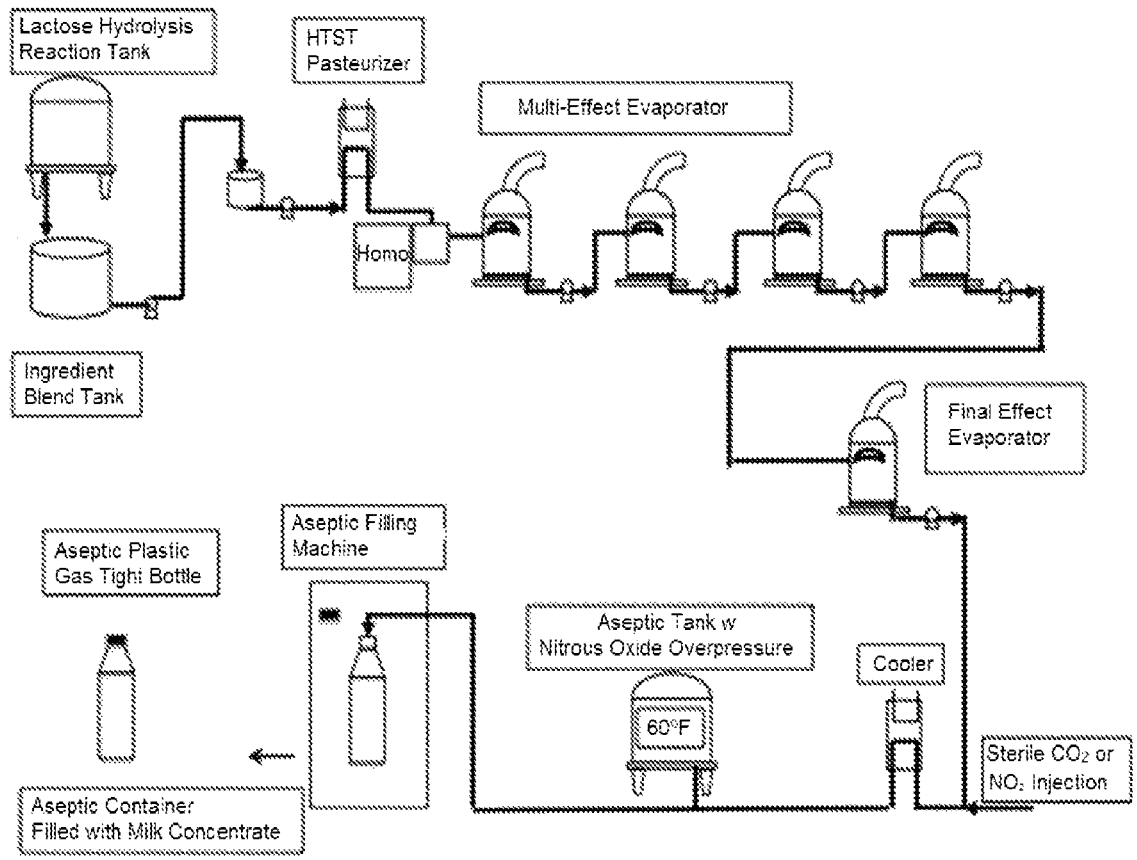
FIG. 8 shows a schematic illustrating the method steps described in Example 11.

Lactose in milk is hydrolyzed by the addition of 0.01% (w/w) aseptically sterile lactase (MAXILACT by DSM, The Netherlands) (FIG. 8). Sweeteners (e.g., 14.5% (w/w) fructose) are added to the hydrolyzed milk and the resulting mixture is heat treated at 161.4° F. for 63 seconds to inactivate pathogens and spoilage organisms. The mixture is homogenized with a dynamic mixer to provide uniform distribution within the mixture. The mixture is concentrated with a multiple effect evaporator. The final effect evaporator is operated at 100-110° F. (38-43° C.) for 2 to 5 minutes under 2.5 psi. The final milk concentrate has a water activity below 0.877.

Sterile nitrous oxide is added in line at 1 bar to the final milk concentrate. The final milk concentrate with nitrous oxide is held in an aseptic tank such that the nitrous oxide is at 4 bar in the tank. The final milk concentrate is cooled to about 25° C. and aseptically packaged in a pressurized sterile container at 4 bar.

4. Clauses

For reasons of completeness, various aspects of the invention are set out in the following numbered clauses:

Clause 1. A method for gas infusing milk, the method comprising: (a) providing milk; (b) concentrating and hydrolyzing the milk to form a lactose hydrolyzed milk concentrate; and (c) introducing soluble gasses into the lactose hydrolyzed milk concentrate to form a gas infused milk concentrate.

Clause 2. The method of clause 1, wherein the gas infused milk concentrate contains a partial pressure of the soluble gas of about 0 pounds per square inch absolute (psia) to about 88.2 psia.

Clause 3. The method of clause 2, wherein the gas infused milk concentrate contains a partial pressure of the soluble gas of about 0 psia to about 14.7 psia.

Clause 4. The method of any one of clauses 1-3 where the soluble gas is nitrous oxide, carbon dioxide, or a combination of nitrous oxide and carbon dioxide.

Clause 5. The method of any one of clauses 1-4, further including the gas infused milk concentrate into a stream of carbonated or still water resulting in a gas infused milk beverage.

Clause 6. The method of clause 5 wherein the gas infused milk beverage has a RI Brix of about 7-16.

Clause 7. The method in any one of clauses 1-6, wherein the milk is 1% milk, 2% milk, whole milk, half and half, or cream.

Clause 8. The method in any one of clauses 1-7, wherein concentrating includes introducing the milk into an evaporator and evaporating the milk to form the lactose hydrolyzed milk concentrate.

Clause 9. The method of clause 8, wherein the evaporation is under temperatures of about 37° C. to about 50° C.

Clause 10. The method in any one of clauses 8-9, wherein evaporation is under vacuum pressures of 2.5 psia or less.

Clause 11. The method of clause 10 wherein the resulting lactose hydrolyzed milk concentrate has 0-4 mg/L dissolved oxygen after the evaporation.

Clause 12. The method in any one of clauses 1-11, wherein concentrating includes evaporation, reverse osmosis, or a combination thereof to form the lactose hydrolyzed milk concentrate.

Clause 13. The method in any one of clauses 1-12, wherein hydrolyzing lactose in the milk includes adding lactase to the milk.

Clause 14. The method in any one of clauses 1-13, further comprising adding sugar, cream, an emulsifier, or a flavoring to the hydrolyzed milk concentrate.

Clause 15. The method of clause 14 wherein the sugar is fructose.

Clause 16. The method in any one of clauses 14-15 wherein the flavoring is chocolate.

Clause 17. The method in any one of clauses 14-16 wherein the emulsifier is sodium stearoyl lactylate.

Clause 18. The method in any one of clauses 1-17, wherein the lactose hydrolyzed milk concentrate has fat particle sizes of about 0.1 μm to about 10 μm.

Clause 19. The method in any one of clauses 1-18, wherein the lactose hydrolyzed milk concentrate contains less than about 2% (w/w) lactose crystals.

Clause 20. The method in any one of the clauses of 1-19 wherein the lactose hydrolyzed milk concentrate has a solids concentration of about 42%-70% (w/w).

Clause 21. The method in any one of the clauses of 1-20 wherein the lactose hydrolyzed milk concentrate has 0-4 mg/L dissolved oxygen in the lactose hydrolyzed milk concentrate.

Clause 22. A method for gas infusing milk, the method comprising: (a) providing a lactose hydrolyzed milk concentrate having a solids concentration of about 50%-77% (w/w); and (c) introducing soluble gasses into the lactose hydrolyzed milk concentrate to form a gas infused milk concentrate.

Clause 23. The method in clause 22, wherein the lactose hydrolyzed milk concentrate has fat particle sizes of about 0.1 μm to about 10 μm.

Clause 24. The method in any one of clauses 22-23, wherein the lactose hydrolyzed milk concentrate contains less than about 2% (w/w) lactose crystals.

Clause 25. The method in any one of the clauses of 22-24 wherein the lactose hydrolyzed milk concentrate has 0-4 mg/L dissolved oxygen in the hydrolyzed milk concentrate.

Clause 26. The method in any one of the clauses of 22-25 wherein the lactose hydrolyzed milk concentrate has a water activity of between 0.85-0.92.

Clause 27. The method in any one of the clauses of 22-25 wherein the lactose hydrolyzed milk concentrate has a water activity of 0.85 or lower.

Clause 28. The method any one of the clauses of 22-27, wherein the gas infused milk concentrate contains a partial pressure of the soluble gas of about 0 pounds per square inch absolute (psia) to about 88.2 psia.

Clause 29. The method any one of the clauses of 22-28, wherein the gas infused milk concentrate contains a partial pressure of the soluble gas of about 0 psia to about 14.7 psia.

Clause 30. The method any one of the clauses of 22-29 where the soluble gas is nitrous oxide, carbon dioxide, or a combination of nitrous oxide and carbon dioxide.

Clause 31. The method any one of the clauses of 22-30, further including the gas infused milk concentrate into a stream of carbonated or still water resulting in a gas infused milk beverage.

Clause 32. The method of clauses 31 wherein the gas infused milk beverage has a RI Brix of about 7-16.

Clause 33. A method for gas infusing milk, the method comprising: (a) providing milk; (b) concentrating the milk by evaporating the milk in a multi-stage evaporator until the milk has between 34-50% solids (w/w) forming a first concentrated milk; (c) hydrolyzing the first concentrated milk by adding lactase to form a lactose hydrolyzed milk concentrate; (d) further concentrating the lactose hydrolyzed milk concentrate by evaporating the milk in a vacuum evaporator at a pressure of 2.5 psia or less to form a final lactose hydrolyzed milk concentrate and (e) introducing soluble gasses into the final lactose hydrolyzed milk concentrate to form a gas infused milk concentrate.

Clause 34. The method of clause 33, wherein the gas infused milk concentrate contains a partial pressure of the soluble gas of about 0 pounds per square inch absolute (psia) to about 88.2 psia.

Clause 35. The method of any one of clauses 33-34, wherein the gas infused milk concentrate contains a partial pressure of the soluble gas of about 0 psia to about 14.7 psia.

Clause 36. The method of any one of clauses 33-35 where the soluble gas is nitrous oxide, carbon dioxide, or a combination of nitrous oxide and carbon dioxide.

Clause 37. The method of any one of clauses 33-36, further including the gas infused milk concentrate into a stream of carbonated or still water resulting in a gas infused milk beverage.

Clause 38. The method of clause 37 wherein the gas infused milk beverage has a RI Brix of about 7-16.

Clause 39. The method in any one of clauses 33-38, wherein the milk is 1% milk, 2% milk, whole milk, half and half, or cream.

Clause 40. The method in any one of clauses 33-39, wherein the vacuum evaporation is under temperatures of about 37° C. to about 50° C.

Clause 41. The method in any one of clauses 33-40 wherein the final lactose hydrolyzed milk concentrate has 0-4 mg/L dissolved oxygen after the evaporation.

Clause 42. The method in any one of clauses 33-41, further comprising adding sugar, cream, an emulsifier, or a flavoring to the lactose hydrolyzed milk concentrate.

Clause 43. The method of clause 42 wherein the sugar is fructose.

Clause 44. The method in any one of clauses 42-43 wherein the flavoring is chocolate.

Clause 45. The method in any one of clauses 42-44 wherein the emulsifier is sodium stearoyl lactylate.

Clause 46. The method in any one of clauses 33-45, wherein the final lactose hydrolyzed milk concentrate has fat particle sizes of about 0.1 µm to about 10 µm.

Clause 47. The method in any one of clauses 33-46, wherein the final lactose hydrolyzed milk concentrate contains less than about 2% (w/w) lactose crystals.

Clause 48. The method in any one of clauses 33-47 wherein the final lactose hydrolyzed milk concentrate has a solids concentration of about 42%-70% (w/w).

Clause 49. A method for gas infusing milk, the method comprising: (a) providing milk; (b) concentrating the milk by using reverse osmosis by passing the milk through one or more membrane filters until the milk has between 20-40% solids (w/w) forming a first concentrated milk; (c) hydrolyzing the first concentrated milk by adding lactase to form a lactose hydrolyzed milk concentrate; (d) further concentrating the lactose hydrolyzed milk concentrate by evaporating the milk in a vacuum evaporator at a pressure of 2.5 psia or less to form a final lactose hydrolyzed milk concentrate and (e) introducing soluble gasses into the final lactose hydrolyzed milk concentrate to form a gas infused milk concentrate.

Clause 50. The method of clause 49, wherein the gas infused milk concentrate contains a partial pressure of the soluble gas of about 0 pounds per square inch absolute (psia) to about 88.2 psia.

Clause 51. The method of any one of clauses 49-50, wherein the gas infused milk concentrate contains a partial pressure of the soluble gas of about 0 psia to about 20 psia.

Clause 52. The method of any one of clauses 49-51 where the soluble gas is nitrous oxide, carbon dioxide, or a combination of nitrous oxide and carbon dioxide.

Clause 53. The method of any one of clauses 49-52, further including introducing the gas infused milk concentrate into a stream of carbonated or still water resulting in a gas infused milk beverage.

Clause 54. The method of clause 53 wherein the gas infused milk beverage has a RI Brix of about 7-16.

Clause 55. The method in any one of clauses 49-54, wherein the milk is 1% milk, 2% milk, whole milk, half and half, or cream.

Clause 56. The method in any one of clauses 49-55, wherein the vacuum evaporation is under temperatures of about 37° C. to about 50° C.

Clause 57. The method in any one of clauses 49-56 wherein the final lactose hydrolyzed milk concentrate has 0-4 mg/L dissolved oxygen after the evaporation.

Clause 58. The method in any one of clauses 49-57, further comprising adding one or more sugars, cream, an emulsifier, or a flavoring to the lactose hydrolyzed milk concentrate.

Clause 59. The method of clause 58 wherein the sugar is fructose.

Clause 60. The method in any one of clauses 58-59 wherein the flavoring is chocolate.

Clause 61. The method in any one of clauses 58-60 wherein the emulsifier is sodium stearoyl lactylate.

Clause 62. The method in any one of clauses 49-61, wherein the final lactose hydrolyzed milk concentrate has fat particle sizes of about 0.1 µm to about 10 µm.

Clause 63. The method in any one of clauses 49-62, wherein the final lactose hydrolyzed milk concentrate contains less than about 2% (w/w) lactose crystals.

Clause 64. The method in any one of clauses 49-63 wherein the final lactose hydrolyzed milk concentrate has a solids concentration of about 42%-70% (w/w).

Clause 65. A gas infused milk product, wherein the gas infused milk product comprises a lactose hydrolyzed concentrated milk having a 52-94% (w/w) solids infused with a soluble gas.

Clause 66. The gas infused milk product of clause 65, wherein the soluble gas is nitrous oxide.

Clause 67. The gas infused milk product of any one of clauses 65-66, wherein the gas infused milk product contains a partial pressure of soluble gas of about 0 pounds per square inch absolute (psia) to about 88.2 psia.

Clause 68. The gas infused milk product any one of clauses 65-67, wherein the gas infused milk product contains a partial pressure of soluble gas of about 0 psi to about 14.7 psia.

Clause 69. The gas infused milk product of any one of clauses 65-68, wherein the gas infused milk product contains less than about 10% denatured protein.

Clause 70. The gas infused milk product of any one of clauses 65-69, wherein the gas infused milk product contains less than about 2% denatured protein.

Clause 71. The gas infused milk product of any one of clauses 65-70, wherein the gas infused milk product contains less than about 5% lactose crystals.

Clause 72. The gas infused milk product of any one of clauses 65-71, wherein the gas infused milk product contains less than about 2% lactose crystals.

Clause 73. The gas infused milk product of any one of clauses 65-72 wherein the gas infused milk product contains one or more sugars, cream, flavorings, emulsifiers, or vitamins.

Clause 74. The gas infused milk product of clause 73 wherein the sugar is fructose.

Clause 75. The gas infused milk product of any one of clauses 73-74 wherein the flavoring is chocolate.

Clause 76. The gas infused milk product of any one of clauses 73-75 wherein the emulsifier is sodium stearoyl lactylate.

Clause 77. The gas infused milk product of any one of clauses 65-76 wherein the gas infused milk product has a water activity of between 0.85-0.92.

Clause 78. The gas infused milk product of any one of clauses 65-76 wherein the gas infused milk product has a water activity of between 0.85 or lower.

Clause 79. The gas infused milk product of any one of clauses 65-78, wherein the gas infused milk product contains 0% lactose crystals.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A method for preparing a gas-infused milk concentrate, the method comprising:
   providing milk;
   concentrating the milk to form a milk concentrate;
   hydrolyzing the milk concentrate by adding lactase to form a lactose hydrolyzed milk concentrate;
   adding at least one of fructose, anhydrous fructose, liquid fructose syrup and a polyol after hydrolyzing the milk concentrate to increase a solubility and a dispersibility of the lactose hydrolyzed milk concentrate; and
   introducing one or more soluble gasses into the lactose hydrolyzed milk concentrate to form a gas infused milk concentrate, wherein introducing the one or more soluble gasses includes flowing nitrous oxide gas into the lactose hydrolyzed milk concentrate.

2. The method of claim 1, wherein the gas infused milk concentrate contains a partial pressure of the one or more soluble gasses of more than about 0 pounds per square inch absolute (psia) to about 88.2 psia.

3. The method of claim 1, wherein the gas infused milk concentrate contains a partial pressure of the one or more soluble gasses of more than about 0 psia to about 14.7 psia.

4. The method of claim 1, wherein the one or more soluble gases further includes carbon dioxide.

5. The method of claim 1, further comprising mixing the gas infused milk concentrate into a stream of carbonated or still water resulting in a gas infused milk beverage.

6. The method of claim 5 wherein the gas infused milk beverage has a RI Brix of about 7 to about 16.

7. The method of claim 1, wherein the milk is 1% milk, 2% milk, whole milk, half and half, or cream.

8. The method of claim 1, wherein concentrating includes introducing the milk into an evaporator and evaporating the milk to form the milk concentrate.

9. The method of claim 8, wherein the evaporation is under temperatures of about 37° C. to about 50° C.

10. The method of claim 8, wherein evaporation is under vacuum pressures of 2.5 psia or less.

11. The method of claim 10 wherein the milk concentrate has 0-4 mg/L dissolved oxygen after the evaporation.

12. The method of claim 1, wherein concentrating includes evaporation, reverse osmosis, or a combination thereof to form the milk concentrate.

13. The method of claim 1, further comprising adding cream, an emulsifier, or a flavoring to the lactose hydrolyzed milk concentrate.

14. The method of claim 13 wherein the flavoring is chocolate.

15. The method of claim 13 wherein the emulsifier is sodium stearoyl lactylate.

16. The method of claim 1, wherein the lactose hydrolyzed milk concentrate has fat particle sizes of about 0.1 μm to about 10 μm.

17. The method of claim 1, wherein the lactose hydrolyzed milk concentrate contains less than about 2% (w/w) lactose crystals.

18. The method of claim 1 wherein the lactose hydrolyzed milk concentrate has a solids concentration of about 42%-70% (w/w).

19. The method of claim 1 wherein the lactose hydrolyzed milk concentrate has 0-4 mg/L dissolved oxygen in the lactose hydrolyzed milk concentrate.

20. A method for gas infusing milk, the method comprising:
    providing a lactose hydrolyzed milk concentrate having a solids concentration of about 50%-77% (w/w);
    adding at least one of fructose, anhydrous fructose, liquid fructose syrup and a polyol in an amount of about 1% to about 10% (w/w) to the lactose hydrolyzed milk concentrate to increase a solubility and a dispersibility of the lactose hydrolyzed milk concentrate; and
    introducing one or more soluble gasses into the lactose hydrolyzed milk concentrate to form a gas infused milk concentrate, wherein introducing the one or more soluble gasses includes flowing nitrous oxide gas into the lactose hydrolyzed milk concentrate.

21. A method for gas infusing milk, the method comprising:
    providing milk;
    concentrating the milk by evaporating the milk in a multi-stage evaporator until the milk has between 34%-50% solids (w/w) forming a milk concentrate;
    hydrolyzing the milk concentrate by adding lactase to form a lactose hydrolyzed milk concentrate;
    adding at least one of fructose, anhydrous fructose, liquid fructose syrup and a polyol in an amount of about 1% to about 10% (w/w) to the lactose hydrolyzed milk concentrate to increase a solubility and a dispersibility of the lactose hydrolyzed milk concentrate;

further concentrating the lactose hydrolyzed milk concentrate in a vacuum evaporator at a pressure of 2.5 psia or less to form a final lactose hydrolyzed milk concentrate; and introducing one or more soluble gasses into the final lactose hydrolyzed milk concentrate to form a gas infused milk concentrate, wherein introducing the one or more soluble gasses includes flowing nitrous oxide gas into the final lactose hydrolyzed milk concentrate.

22. A method for gas infusing milk, the method comprising:

providing milk;

concentrating the milk to form by using reverse osmosis by passing the milk through one or more membrane filters until the milk has between 20%-40% solids (w/w) forming a milk concentrate;

hydrolyzing the milk concentrate by adding lactase to form a lactose hydrolyzed milk concentrate;

adding at least one of fructose, anhydrous fructose, liquid fructose syrup and a polyol in an amount of about 1% to about 10% (w/w) to the lactose hydrolyzed milk concentrate to increase a solubility and a dispersibility of the lactose hydrolyzed milk concentrate;

further concentrating the lactose hydrolyzed milk concentrate in a vacuum evaporator at a pressure of 2.5 psia or less to form a final lactose hydrolyzed milk concentrate; and introducing one or more soluble gasses into the final lactose hydrolyzed milk concentrate to form a gas infused milk concentrate, wherein introducing the one or more soluble gasses includes flowing nitrous oxide gas into the final lactose hydrolyzed milk concentrate.

* * * * *